United States Patent
Kubota et al.

(10) Patent No.: US 10,365,514 B2
(45) Date of Patent: Jul. 30, 2019

(54) LIQUID CRYSTAL DISPLAY DEVICE AND ELECTRONIC DEVICE

(71) Applicant: Semiconductor Energy Laboratory Co., Ltd., Atsugi-shi, Kanagawa-ken (JP)

(72) Inventors: Daisuke Kubota, Atsugi (JP); Yoshiharu Hirakata, Ebina (JP); Masahiko Hayakawa, Tochigi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 186 days.

(21) Appl. No.: 15/177,477

(22) Filed: Jun. 9, 2016

(65) Prior Publication Data
US 2016/0282648 A1    Sep. 29, 2016

Related U.S. Application Data

(63) Continuation of application No. 14/177,543, filed on Feb. 11, 2014, now Pat. No. 9,366,913.

(30) Foreign Application Priority Data

Feb. 21, 2013 (JP) .................. 2013-032084

(51) Int. Cl.
*G02F 1/1333* (2006.01)
*G02F 1/1339* (2006.01)
(Continued)

(52) U.S. Cl.
CPC .......... *G02F 1/1339* (2013.01); *G02F 1/1368* (2013.01); *G02F 1/13439* (2013.01);
(Continued)

(58) Field of Classification Search
CPC .. G02F 1/1339; G02F 1/13439; G02F 1/1368; G02F 2001/133311; G02F 2001/133357
(Continued)

(56) References Cited

U.S. PATENT DOCUMENTS 5,838,411 A    11/1998   Hayakawa et al.
5,946,057 A *  8/1999   Kusanagi .......... G02F 1/136204
                                                  349/139
(Continued)

FOREIGN PATENT DOCUMENTS

EP    2690492 A    1/2014
JP    08-136911 A   5/1996
(Continued)

*Primary Examiner* — Charles S Chang
(74) *Attorney, Agent, or Firm* — Robinson Intellectual Property Law Office; Eric J. Robinson

(57) ABSTRACT

An active matrix liquid crystal display device including a counter substrate and an element substrate firmly attached with each other with a sealant, and a liquid crystal layer between the counter substrate and the element substrate is provided. The counter substrate is provided with at least a resin layer. An outer end portion of the resin layer is not exposed to the outside atmosphere. The resin layer and the sealant at least partly overlap with each other when seen from a cross section of the liquid crystal display device. A moisture impermeable layer is formed between the resin layer and the sealant.

30 Claims, 10 Drawing Sheets

US 10,365,514 B2
Page 2

(51) Int. Cl.
  *G02F 1/1343* (2006.01)
  *G02F 1/1368* (2006.01)

(52) U.S. Cl.
  CPC ............ *G02F 2001/133311* (2013.01); *G02F 2001/133357* (2013.01)

(58) Field of Classification Search
  USPC ........................................................ 349/138
  See application file for complete search history.

(56) References Cited

U.S. PATENT DOCUMENTS

| | | | |
|---|---|---|---|
| 6,304,308 B1 * | 10/2001 | Saito | G02F 1/133512 349/110 |
| 6,392,735 B1 * | 5/2002 | Tani | G02F 1/1339 349/153 |
| 7,190,115 B2 | 3/2007 | Tsuchiya et al. | |
| 7,436,473 B2 * | 10/2008 | Nam | G02F 1/133512 349/110 |
| 7,446,336 B2 | 11/2008 | Yamazaki et al. | |
| 7,465,593 B2 | 12/2008 | Yamazaki et al. | |
| 7,619,258 B2 | 11/2009 | Tsuchiya et al. | |
| 7,768,617 B2 | 8/2010 | Yamazaki et al. | |
| 7,920,240 B2 | 4/2011 | Yonemura | |
| 7,960,733 B2 | 6/2011 | Yamazaki et al. | |
| 8,179,040 B2 | 5/2012 | Tsuchiya et al. | |
| 8,242,496 B2 | 8/2012 | Yamazaki et al. | |
| 8,455,873 B2 | 6/2013 | Yamazaki et al. | |
| 8,982,306 B2 | 3/2015 | Yamaguchi et al. | |
| 9,323,109 B2 | 4/2016 | Yamaguchi et al. | |
| 9,377,644 B2 | 6/2016 | Moriguchi et al. | |
| 9,835,905 B2 | 12/2017 | Yamaguchi et al. | |
| 2006/0170854 A1 * | 8/2006 | Han | G02F 1/1339 349/153 |
| 2008/0111957 A1 * | 5/2008 | Lee | G02F 1/133514 349/110 |
| 2009/0225183 A1 | 9/2009 | Tamura | |
| 2011/0249376 A1 | 10/2011 | Wu | |
| 2018/0045997 A1 | 2/2018 | Yamaguchi et al. | |

FOREIGN PATENT DOCUMENTS

| | | |
|---|---|---|
| JP | 08-278507 A | 10/1996 |
| JP | 09-015613 A | 1/1997 |
| JP | 09-244011 A | 9/1997 |
| JP | 10-333158 A | 12/1998 |
| JP | 11-295743 A | 10/1999 |
| JP | 2003-121860 A | 4/2003 |
| JP | 3531048 | 5/2004 |
| JP | 2005-078946 A | 3/2005 |
| JP | 2005-302707 A | 10/2005 |
| JP | 2007-328027 A | 12/2007 |
| JP | 2008-151969 A | 7/2008 |
| JP | 2012-255840 A | 12/2012 |
| WO | WO-2004/057920 | 7/2004 |
| WO | WO-2012/132953 | 10/2012 |

* cited by examiner

LIQUID CRYSTAL DISPLAY DEVICE AND ELECTRONIC DEVICE

BACKGROUND OF THE INVENTION

1. Field of the Invention

The present invention relates to an object, a method, or a manufacturing method. Further, the present invention relates to a process, a machine, manufacture, or a composition of matter. In particular, the present invention relates to, for example, a semiconductor device, a display device, a light-emitting device, a driving method thereof, or a manufacturing method thereof. In particular, the present invention relates to, for example, a liquid crystal display device and an electronic device using the liquid crystal display device.

2. Description of the Related Art

Liquid crystal display devices for mobile use such as smartphones and tablets are in their heyday. It is reported that despite slow down in sales of home-use televisions and the like, some liquid crystal devices have been sold well such that demand outstrips supply. There is always replacement demand for mobile devices usually replaced in a few years, which is different from the case of home-use televisions, and thus the mobile devices are lifelines of Japanese display industry in a slump.

Development of highly refined goods is essential to create the replacement demand; accordingly, displays with high image quality and reduced frame width have been demanded.

A liquid crystal display device has a structure in which a liquid crystal material is sealed in a space between a pair of substrates whose periphery is firmly attached with a sealant. In general, one of the pair of substrates is provided with a color filter and a black matrix, and the other thereof is provided with a driving element in the case of an active matrix liquid crystal display device.

In order to prevent moisture absorption and water penetration due to exposure of a planarization film on an element substrate side to the outside atmosphere, Patent Document 1 discloses a structure in which a planarization film is provided so that an end portion thereof overlaps with a sealant.

There has been growing demand to reduce a non-display area positioned outside an effective display area, i.e., the width of a frame area, in a liquid crystal display device. A large-size display with a frame width of several millimeters and even a small-size display with a frame width of less than 1 mm have been released.

Although being used for sealing or needed for mounting of a driver, the frame area is greatly reduced due to a reduction in the width.

A sealant used for sealing is a resin and thus has low moisture permeability but does not completely shield against water. Conventionally, a certain width can be used for a sealing region; thus, influence of water from the outside atmosphere can be reduced at least for a period in which a device is driven.

In these days, since a reduction in a frame width is underway, it is difficult to secure a sufficient frame width.

REFERENCE

Patent Document

[Patent Document 1] Japanese Patent No. 3531048

SUMMARY OF THE INVENTION

In view of the above, an object of one embodiment of the present invention is to provide a highly durable liquid crystal display device.

Another object of one embodiment of the present invention is to provide a highly durable liquid crystal display device with a reduced frame width. Another object of one embodiment of the present invention is to provide a liquid crystal display device which hardly allows penetration of water. Another object of one embodiment of the present invention is to provide a liquid crystal display device with a reduced frame width. Another object of one embodiment of the present invention is to provide a novel liquid crystal display device. Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an active matrix liquid crystal display device including a counter substrate and an element substrate firmly attached with each other with a sealant, and a liquid crystal layer between the counter substrate and the element substrate. The counter substrate is provided with at least a resin layer. An end portion of the resin layer is not exposed to the outside atmosphere. The resin layer and the sealant at least partly overlap with each other when seen from a cross section of the liquid crystal display device. A moisture impermeable layer is formed between the resin layer and the sealant.

The liquid crystal display device of one embodiment of the present invention is a highly durable liquid crystal display device.

DETAILED DESCRIPTION OF THE INVENTION

Figure 1A:
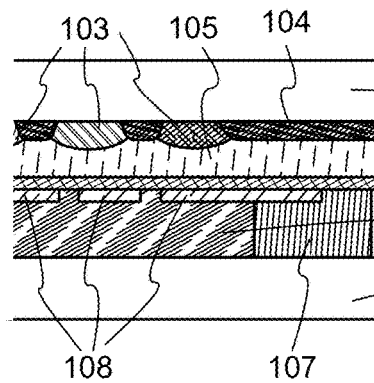
FIGS. 1A to 1F each illustrate a sealing structure.

Embodiments of the present invention will be described below in detail. Note that the present invention is not limited to the description below, and a variety of changes can be made without departing from the spirit and scope of the present invention. Therefore, the present invention is not construed as being limited to the description given below.

Note that a liquid crystal display device in this specification includes a panel in which a display element is sealed and a module in which an integrated circuit (IC) or the like including a controller is mounted to the panel in its category. An element substrate, which corresponds to one embodiment before a display element is completed in a manufacturing process of the liquid crystal display device, is provided with means for supplying current to the display element in each of a plurality of pixels. Specifically, the element substrate may be in a state in which only a pixel electrode of the display element is provided, a state after a conductive film to be a pixel electrode is formed and before the conductive film is etched to form the pixel electrode, or any of other states.

Further, the liquid crystal display device in this specification refers to an image display device or a light source (including a lighting device) in some cases. Furthermore, the liquid crystal display device may include the following modules in its category in some cases: a module to which a connector, for example, a flexible printed circuit (FPC) or a tape carrier package (TCP) is attached; a module in which a printed wiring board is provided at a tip of a TCP; and a module in which an IC is directly mounted on a display element by a chip on glass (COG) method.

As a resin used for a planarization film or the like of a liquid crystal element, acrylic is often used because of its transparency and handiness. Alternatively, polyimide, a benzocyclobutene-based resin, polyamide, epoxy, or the like can be used. In addition to such organic materials, a low-dielectric constant material (a low-k material), a siloxane-based resin, phosphosilicate glass (PSG), borophosphosilicate glass (BPSG), or the like can be used. Such materials are generally known to have high moisture permeability. For this reason, a structure in which an end portion of a resin layer such as a planarization film is not exposed to the outside atmosphere and is positioned in a region surrounded by a sealant or inside a sealant is proposed in Patent Document 1, for example.

A sealant has moisture permeability much lower than those of the above-described resins that are generally used. A liquid crystal display device with a sufficient frame width can be prevented from being affected by water for a long period by using a sealant with a sufficient width. However, a liquid crystal display device with a reduced frame width is easily affected by water because a sealant cannot have a sufficient width.

For this reason, it is preferable that a sealant be provided to overlap with at least part of a resin layer, such as a planarization film or a black matrix continuously provided also in an effective pixel portion, when seen in the cross section and be formed so that the width of a portion bonded with the sealant is large. Note that the cross section in such a case is a cross section taken perpendicularly to a display surface.

Embodiment 1

FIGS. 1A to 1F are cross-sectional views each illustrating a sealing portion of a liquid crystal display device in this embodiment. In each of FIGS. 1A to 1F, the right side corresponds to an end portion of the liquid crystal display device and the left side corresponds to an inner side of the liquid crystal display device.

In each of FIGS. 1A to 1F, a counter substrate 100 and an element substrate 101 are firmly attached to each other with a sealant 107, and a liquid crystal layer 102 is provided in a space between the element substrate 101 and the counter substrate 100. The counter substrate 100 is provided with color filters 103, a black matrix 104, and a planarization film 105 covering the color filters 103 and the black matrix 104. At least the planarization film 105 is formed of a resin. The material of the planarization film 105 is mainly acrylic or the like and has moisture permeability more than or equal to 10 times as high as that of the sealant 107. The black matrix 104 can be formed of a metal or a resin. In the case of using a resin, the black matrix 104 easily transmits water like the planarization film 105. Note that in the case where the black matrix 104 is formed of a resin, the black matrix 104 and the planarization film 105 which are formed in contact with each other as illustrated in FIG. 1A can be regarded as one resin layer. Although not illustrated, an alignment film may be formed in contact with the liquid crystal layer 102.

In addition, although not illustrated, a driving element, a planarization film, an alignment film, and the like may be formed over the element substrate 101, and the element substrate including such components is referred to as the element substrate 101 here. Note that the components of the element substrate 101 are not limited to the above components, and it is not necessary to form all the components. For example, in the case of a passive matrix liquid crystal display device, it is not necessary to form the driving element, and in the case of a display mode which does not require the alignment film, such as a display mode using a blue phase, it is not necessary to form the alignment film.

FIG. 1A illustrates a structure in which part of a resin layer is exposed to the outside atmosphere. In such a case, the planarization film 105 and the color filters 103 are collectively referred to as the resin layer. In the case where the black matrix 104 is formed of a resin, the black matrix 104, the planarization film 105, and the color filters 103 are collectively referred to as the resin layer.

Since part of the resin layer is exposed to the outside atmosphere in the structure in FIG. 1A, water diffuses into the resin layer relatively quickly. The water that reaches the liquid crystal layer and the driving element might accelerate deterioration of the liquid crystal display device.

For this reason, in the structure in FIG. 1A, a moisture impermeable layer 106 is provided so that the liquid crystal layer 102 is not in contact with the resin layer. With the moisture impermeable layer 106, water which enters the inside of the resin layer can be inhibited from reaching the liquid crystal layer and the driving element, which makes it possible to inhibit the deterioration of the liquid crystal display device. Here, the moisture impermeable layer is a layer formed of a material having low moisture permeability than a material used for the sealant, and the moisture impermeability thereof is preferably as high as possible.

Note that the moisture permeability of the sealant 107 is approximately one-tenth of that of the resin layer; thus, by forming the sealant 107 to overlap with the resin layer, a sufficient frame width can be secured even in a liquid crystal display device with a reduced frame width, and sufficient moisture impermeability can be ensured in normal use.

Further, a reference numeral 108 in the drawing denotes an electrode of the liquid crystal display device that is formed of a transparent conductive film. The electrode 108 is not formed in some cases depending on a driving mode of a liquid crystal, and in such a case, the effect of the structure in FIG. 1A that is one embodiment of the present invention is further exhibited. Examples of the driving mode of such a liquid crystal display device in which the counter substrate 100 is not provided with a common electrode are an in-plane switching (IPS) mode and a fringe field switching mode (FFS), for which the structure in FIG. 1A can be preferably employed.

In the case where the counter substrate 100 is provided with the electrode 108, e.g., the case of a multi-domain vertical alignment (MVA) mode in which the electrode 108 is patterned or the case of a twisted nematic (TN) mode in which the electrode is formed on the entire surface of the substrate, water easily moves from the resin layer to the liquid crystal layer 102 and the driving element as long as a cut line or a hole is provided in the electrode 108 for the purpose of alignment control in addition to gassing; therefore, the structure in FIG. 1A can be preferably employed.

Figure 1B:
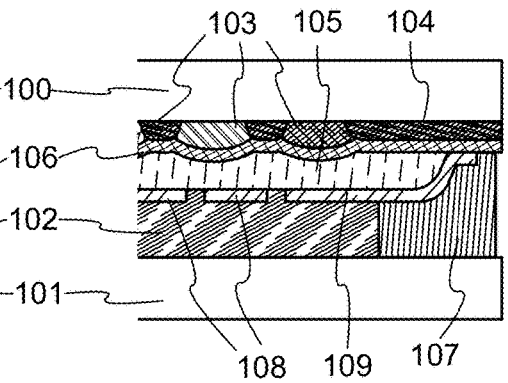

In a structure in FIG. 1B, part of a resin layer is exposed to the outside atmosphere, which is similar to the structure in FIG. 1A. FIG. 1B illustrates the structure in which the black matrix 104 is a resin.

In the resin layer, the planarization film 105 is formed so that an outer end portion thereof is on an inner side than an end portion of the liquid crystal display device and is covered with the sealant 107, and the black matrix 104 is formed to extend to the end portion of the liquid crystal display device.

In the liquid crystal display device with such a structure, water relatively quickly diffuses into the black matrix 104 exposed to the outside atmosphere and the color filters 103 in contact with the black matrix 104. On the other hand, water reaches the planarization film 105 slowly compared with that reaches the black matrix 104, the color filters 103, or the like because the outer end portion of the planarization film 105 is covered with the sealant 107. However, in the case of the planarization film 105 in contact with the black matrix 104 and the color filters 103, water diffuses into the planarization film 105 from the portion where the planarization film 105 is in contact with the black matrix 104 and the color filters 103; therefore, it is not worth forming the planarization film 105 so that the outer end portion thereof is on the inner side.

Thus, in the structure in FIG. 1B, the moisture impermeable layer 106 is provided between a first resin layer (the black matrix 104 and the color filters 103) which is exposed to the outside atmosphere and a second resin layer (the planarization film 105) which is not exposed to the outside atmosphere.

In this structure, water quickly diffuses into only the first resin layer, leading to inhibition of the deterioration of the liquid crystal display device.

Here, although having moisture permeability lower than or equal to one-tenth of that of acrylic or the like used for the planarization film 105 or the black matrix 104, the sealant 107 is not completely impermeable to water. For this reason, even when an outer end portion of the planarization film 105 is covered with the sealant 107 and the sealant 107 has a sufficient width, water might enter the planarization film 105 if there is a portion where the sealant 107 and the planarization film 105 are in contact with and overlap with each other. Once water enters the planarization film 105, the water quickly diffuses; consequently, an effect of inhibiting entry of water, which results from the width of a portion sealed with the sealant 107, cannot be obtained in some cases.

For example, in the case where the outer end portion of the planarization film is positioned at the center of the width of the sealant having moisture permeability one-tenth of that of the planarization film, water that reaches the planarization film at the center enters the inside of the liquid crystal display device in about half the time it takes for water to enter the inside of the liquid crystal display device through the sealant.

For this reason, a moisture impermeable layer is preferably formed in a portion where the planarization film 105 and the sealant 107 overlap with each other. By forming the moisture impermeable layer between the planarization film 105 and the sealant 107, a path through which water enters the planarization film 105 from the sealant 107 is blocked; thus, an effect of inhibiting entry of water, which results from the width of a portion sealed with the sealant 107, can be obtained as designed.

In the structure in FIG. 1B, the electrode 108 provided under the counter substrate 100 is also used as a moisture impermeable layer 109. In such a case, the electrode 108 and the moisture impermeable layer 109 can be formed in the same step, which is advantageous in terms of cost. Further, in such a structure, a transparent conductor of inorganic oxide with low moisture permeability or the like, such as transparent conductive oxide, is preferably used for the electrode 108. It is needless to say that the moisture impermeable layer 109 and the electrode 108 may be provided in different steps. Note that the moisture impermeable layer 109 is provided at least in a portion where the sealant 107 and the planarization film 105 overlap with each other.

Figure 1C:
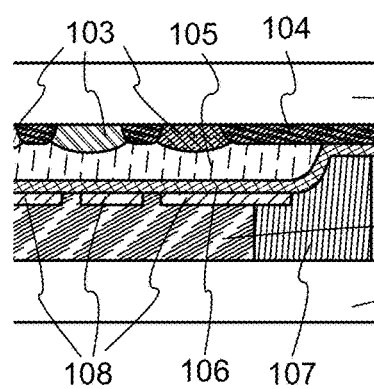

In a structure in FIG. 1C, the state of water diffusion is different between the case of using a resin for the black matrix 104 and the case of using a metal for the black matrix 104. In the case of using a resin for the black matrix 104, part of a resin layer (the color filters 103, the black matrix 104, and the planarization film 105) is exposed to the outside atmosphere. Hence, the moisture impermeable layer 106 is formed between the liquid crystal layer 102 and the resin layer to inhibit water from entering the liquid crystal layer 102 or the driving element. Further, an outer end portion of the planarization film 105 is formed on an inner side than end portions of the substrates, and a surface of the planarization film 105 is covered with the sealant 107. Furthermore, the planarization film 105 and the sealant 107 overlap with each other but are not in direct contact with each other, and the moisture impermeable layer 106 is formed therebetween; thus, entry of water from the sealant 107 to the planarization film 105 is inhibited, which makes it possible to obtain an effect of inhibiting entry of water, which results from the width of a portion sealed with the sealant 107.

In the case of using a metal for the black matrix 104, the resin layer (the color filters 103 and the planarization film 105) is isolated from the outside atmosphere even when the moisture impermeable layer 106 is not formed. Thus, it is less likely to be affected by external water and is possible to inhibit deterioration more effectively. Further, the planarization film 105 and the sealant 107 overlap with each other but are not in direct contact with each other, and the moisture impermeable layer 106 is formed therebetween; thus, entry of water from the sealant 107 to the planarization film 105 is inhibited, which makes it possible to obtain an effect of inhibiting entry of water, which results from the width of a portion sealed with the sealant 107. Note that in this structure, the moisture impermeable layer 106 is provided at least between the sealant 107 and the planarization film 105.

In the case of using either a resin or a metal for the black matrix 104, it is not necessary to form the electrode 108. When the electrode 108 is not formed, it is more likely to be affected by water which enters the resin layer, in which case this structure can be more preferably employed. Even in the case where the electrode 108 is formed, and the electrode 108 is provided with a hole, a cut line, or a slit or is patterned, when a surface on which the electrode 108 is formed (the moisture impermeable layer 106 in FIG. 1C) is in contact with the liquid crystal layer 102, this structure is also preferably employed for the reason similar to the above. Examples of a driving mode of a liquid crystal display device in which the electrode 108 is not formed include an FFS mode and an IPS mode, and examples of a driving mode of a liquid crystal display device in which the electrode 108 is patterned include an MVA mode. Further, a hole, a slit, or a cut line is formed in the electrode 108 for the purpose of gassing or the like in some cases.

In the liquid crystal display device having any of the structures in FIGS. 1A to 1C, light leakage from a backlight on the periphery of the substrate or entry of external light can be inhibited because the black matrix 104 is formed to extend to end portions of the substrates of the liquid crystal display device, which makes it possible to provide an image which has high quality and is less likely to be affected by light leakage and external light even when the liquid crystal display device has a narrow frame.

Figure 1D:
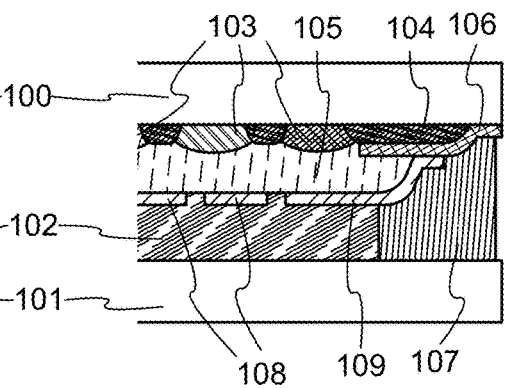

FIG. 1D illustrates a structure in which outer end portions of the black matrix 104 and the planarization film 105 which are correctively referred to as a resin layer are on an inner side than end portions of the substrates of the liquid crystal display device. In this structure, the sealant 107 is on an outer side than the outer end portions of the black matrix 104 and the planarization film 105; thus, the black matrix 104 and the planarization film 105 are shielded from the outside atmosphere.

The moisture impermeable layer 106 is formed between the black matrix 104 which is the resin layer and the sealant 107 to block entry of water. Further, by forming the moisture impermeable layer 109 between the planarization film 105 and the sealant 107 to block entry of water, an effect of inhibiting influence of water, which results from the width of a portion sealed with the sealant 107, can be obtained. FIG. 1D illustrates an example of using the same material for the electrode 108 and the moisture impermeable layer 109 formed between the planarization film 105 and the sealant 107. With such a structure, the moisture impermeable layer 109 and the electrode 108 can be formed at the same time, which results in a reduction in manufacturing steps and thus is advantageous in terms of cost.

In the case of forming the moisture impermeable layer 109 and the electrode 108 at the same time as described above, the electrode 108 is preferably formed using transparent conductive oxide with low moisture permeability, such as ITO. It is needless to say that the moisture impermeable layer 109 and the electrode 108 can be formed in different steps. In such a case, it is not necessary to use a material with low moisture permeability for the material of the electrode 108.

Note that it is not necessary to form the electrode 108. When the electrode 108 is not formed, it is more likely to be affected by water which enters the resin layer, in which case this structure can be more preferably employed. Even in the case where the electrode 108 is formed, it is more likely to be affected by water from the resin layer when a surface on which the electrode 108 is formed (the planarization film 105 in FIG. 1D) is in contact with the liquid crystal layer 102, e.g., when the electrode 108 is provided with a hole, a cut line, or a silt, or the electrode 108 is patterned; therefore, this structure is preferably employed.

Such a structure in which the outer end portion of the black matrix 104 is on an inner side than the end portions of the substrates of the liquid crystal display device increases resistance to electrostatic discharge (ESD), which makes it possible to provide a highly reliable and highly durable liquid crystal display device.

Figure 1E:
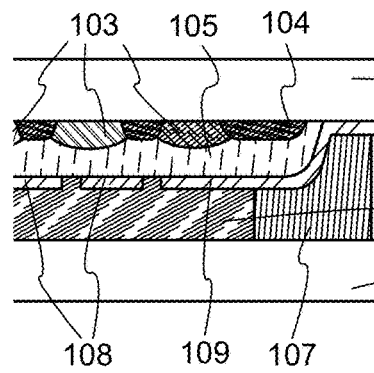

In a structure in FIG. 1E, outer end portions of the black matrix 104 and the planarization film 105 which are collectively referred to as a resin layer are on an inner side than end portions of the substrates. In addition, the outer end portion of the black matrix 104 is on an inner side than the outer end portion of the planarization film 105. An outer end portion of the sealant 107 is on an outer side of the substrates than the outer end portion of the planarization film 105, an inner end portion of the sealant 107 is on an inner side of the substrates than the outer end portion of the planarization film 105, and the planarization film 105 and the sealant 107 partly overlap with each other. Furthermore, in the portion where the planarization film 105 and the sealant 107 partly overlap with each other, the moisture impermeable layer 109 is formed to inhibit water from entering the resin layer from the sealant 107.

In the liquid crystal display device with such a structure, the sealant 107 with relatively low moisture permeability is positioned outside the resin layer with relatively high moisture permeability, which makes it possible to inhibit entry of water. Further, in such a structure, the moisture impermeable layer 109 positioned between the sealant 107 and the resin layer inhibits water from entering the resin layer from the sealant 107; thus, an effect of inhibiting entry of water, which results from the width of a portion sealed with the sealant 107, is easily obtained.

Such a structure in which the outer end portion of the black matrix 104 is on an inner side than the end portions of the substrates of the liquid crystal display device increases resistance to ESD, which makes it possible to provide a highly reliable and highly durable liquid crystal display device.

FIG. 1E illustrates the case where the moisture impermeable layer 109 and the electrode 108 formed under the counter substrate 100 are formed in the same step. Such formation of the electrode 108 and the moisture impermeable layer 109 in the same step leads to a reduction in cost, which has an advantage over the case where the moisture impermeable layer 109 and the electrode 108 are formed in different steps. Note that in such a case, transparent conductive oxide with low moisture permeability is preferably used as the material of the electrode 108.

The electrode 108 and the moisture impermeable layer 109 may be formed in different steps. In such a case, any material can be used for the moisture impermeable layer 109 as long as the material has low moisture permeability; it is sufficient that the electrode 108 is a transparent conductive film, and it is not necessary to use a material with low moisture permeability for the electrode 108.

Note that it is not necessary to form the electrode 108. When the electrode 108 is not formed, it is more likely to be affected by water which enters the resin layer, in which case this structure can be more preferably employed. Even in the case where the electrode 108 is formed, it is more likely to be affected by water which enters the resin layer when a surface on which the electrode 108 is formed (the planarization film 105 in FIG. 1E) is in contact with the liquid crystal layer 102, e.g., when the electrode 108 is provided with a hole, a cut line, or a silt, or the electrode 108 is patterned; therefore, this structure is preferably employed.

Such a structure in which the outer end portion of the black matrix 104 is on an inner side than the end portions of the substrates of the liquid crystal display device increases resistance to ESD, which makes it possible to provide a highly reliable and highly durable liquid crystal display device.

Figure 10A:
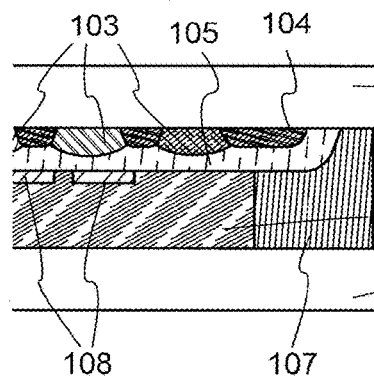
FIGS. 10A and 10B each illustrate a sealing structure.
Figure 10B:
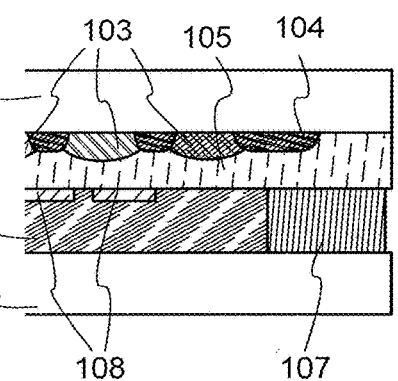

Note that the outer end portion of the black matrix on an inner side than the end portions of the substrates of the liquid crystal display device contributes to an increase in resistance to ESD; therefore, even when the liquid crystal display device has either of structures in FIGS. 10A and 10B, resistance to ESD is increased.

Figure 1F:
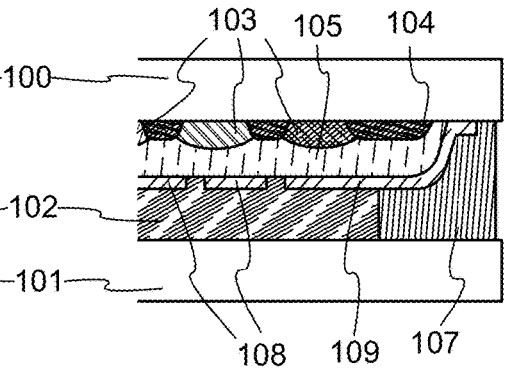

A structure in FIG. 1F is almost similar to that in FIG. 1E; in the structure in FIG. 1F, an outer end portion of the moisture impermeable layer 109 is formed on an inner side than end portions of the substrates, and the sealant 107 is in contact with the counter substrate 100. With the structure in which the sealant 107 is in contact with the counter substrate 100, a more favorable sealing effect can be obtained, which is preferable.

In the liquid crystal display device with any of the structures in FIGS. 1D to 1F, since the black matrix 104 is formed not to extend to the end portions of the substrates, inconvenience caused by light leakage from a backlight or entry of external light might occur. For this reason, in the liquid crystal display device having any of the structures, the sealant 107 is preferably colored in deep color. Coloring can be performed by mixing or dispersing a pigment or powder in deep color into the sealant 107.

FIGS. 2A to 2E are schematic diagrams illustrating arrangement of electrodes in liquid crystal display devices for respective driving methods. FIGS. 2A to 2E illustrate a counter substrate 150, an element substrate 151, a liquid crystal layer 152, an electrode 158 on the counter substrate side, an electrode 160 on the element substrate side, and the like. Note that although the element substrate 101 and the electrode on the element substrate are collectively illustrated as the element substrate 101 in FIGS. 1A to 1F, the element substrate 151 and the electrode 160 on the element substrate side are separately illustrated in FIGS. 2A to 2E. Although not illustrated, an alignment film may be formed between the electrode 158 and the liquid crystal layer 152 or between the electrode 160 and the liquid crystal layer 152. In FIGS. 1A to 1F, the substrate provided with the resin layer and the like is illustrated as the counter substrate 100; on the other hand, in FIGS. 2A to 2E, a resin layer, a moisture impermeable layer, and the counter substrate are collectively illustrated as the counter substrate 150.

Figure 2A:
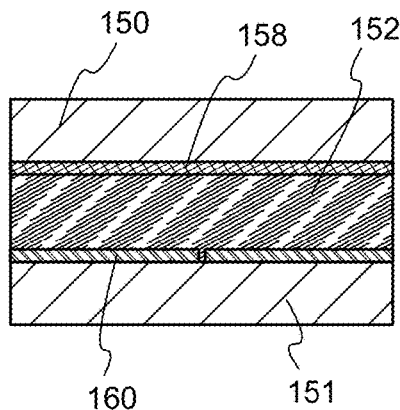
FIGS. 2A to 2E each illustrate an electrode structure of a liquid crystal element.

FIG. 2A is the schematic diagram of arrangement of electrodes in the case of a twisted nematic (TN) mode or a vertical alignment (VA) mode. Although the electrode 158 on the counter substrate side is not patterned, a hole, a cut line, a slit, or the like might be formed on the purpose of gassing or the like; in such a case, any of the structures described in this embodiment can be preferably employed. It is needless to say that even when a hole or the like is not formed intentionally, the use of any of the structures described in this embodiment enables a highly durable liquid crystal display device.

Figure 2B:
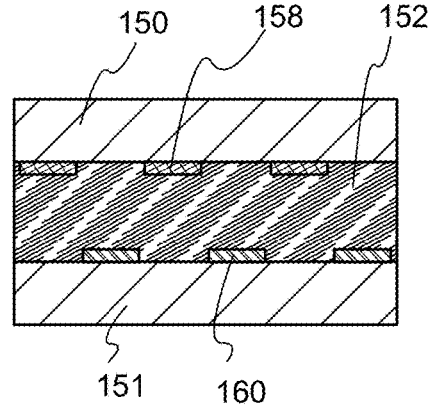

FIG. 2B is the schematic diagram of arrangement of electrodes in the case of a multi-domain vertical alignment (MVA) mode. The electrode 158 on the counter substrate side is patterned, and the liquid crystal layer 152 is in contact with a surface on which the electrode 158 is formed. For a liquid crystal display device of this mode having such a structure, any of the structures described in this embodiment can be preferably employed.

Figure 2C:
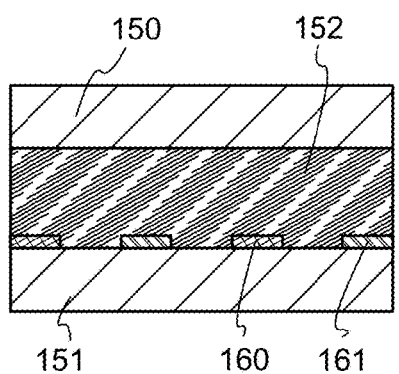

FIG. 2C is the schematic diagram of arrangement of electrodes in the case of an in-plane switching (IPS) mode. In this display mode, the electrode 158 on the counter substrate side is not formed, and a liquid crystal is driven by a horizontal electric field generated between the electrode 160 on the element substrate 151 side and the electrode 161 which is also on the element substrate 151 side. In the liquid crystal display device of this mode having such a structure, an effect of blocking entry of water cannot be expected from the electrode 158 on the counter substrate 150 side; therefore, any of the structures described in this embodiment can be highly preferably employed.

Figure 2D:
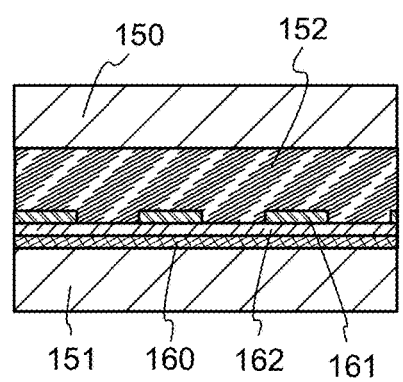

FIG. 2D is the schematic diagram of arrangement of electrodes in the case of a fringe field switching (FFS) mode. In this display mode, the electrode 158 on the counter substrate side is not formed, and a liquid crystal is driven by a fringe electric field formed by providing the electrode 160 on the element substrate 151 side and providing the electrode 161 which is also on the element substrate 151 side over the electrode 160 with an insulating film 162 provided therebetween. In the liquid crystal display device of this mode having such a structure, an effect of blocking entry of water cannot be expected from the electrode 158 on the counter substrate 150 side; therefore, any of the structures described in this embodiment can be highly preferably employed.

Figure 2E:
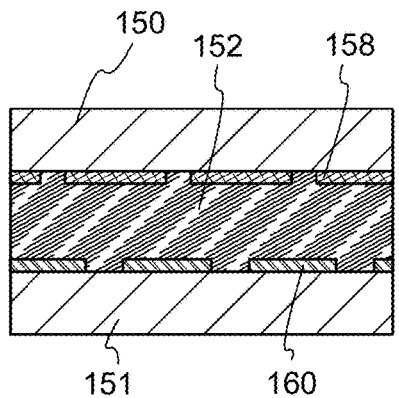

FIG. 2E is the schematic diagram of arrangement of electrodes in the case of an advanced super view (ASV) mode. In this display mode, the electrode 158 on the counter substrate 150 side is patterned; thus, any of the structures described in this embodiment can be preferably employed.

FIGS. 3A to 3E each illustrate part of one embodiment of the present invention in the IPS mode, the FFS mode, or the like; in FIGS. 3A to 3E, the electrode 158 on the counter substrate 150 side is not formed as in FIGS. 2C and 2D. Note that in FIGS. 3A to 3E, a driving element, electrodes on the element substrate side (the electrodes 160 and 161 in FIGS. 2A to 2E), an alignment film, and the like are collectively illustrated as the element substrate 101. Over the element substrate 101, the electrodes 160 and 161 appropriate for a display mode are formed.

Figure 3A:
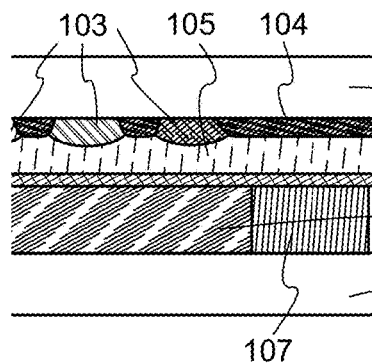
FIGS. 3A to 3E each illustrate a sealing structure.

FIG. 3A corresponds to FIG. 1A. The moisture impermeable layer 106 is formed between a resin layer (the color filters 103, the black matrix 104, and the planarization film 105) exposed to the outside atmosphere and the liquid crystal layer 102. This makes it possible to inhibit water from entering the liquid crystal layer 102 from the resin layer and to reduce an adverse effect due to water. In addition, by forming the moisture impermeable layer 106 between the sealant 107 and the resin layer, capability of the sealant 107 and sealing capability expected from the width of a portion sealed with the sealant 107 can be surely obtained.

Figure 3B:
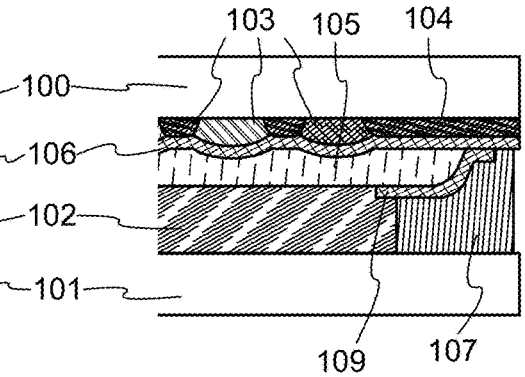

FIG. 3B corresponds to FIG. 1B. In a structure in FIG. 3B, the moisture impermeable layer 106 is formed between a resin layer (the color filters 103 and the black matrix 104) exposed to the outside atmosphere and a resin layer (the planarization film 105) whose outer end portion is close to the liquid crystal layer 102 than the resin layer and is provided on an inner side than end portions of the substrates and which is not exposed to the outside atmosphere. With such a structure, although water diffuses relatively quickly into the resin layer exposed to the outside atmosphere, water can be inhibited from entering the planarization film 105 which is more close to the liquid crystal layer; thus, the liquid crystal layer 102 and the driving element can be inhibited from being adversely affected by water.

Further, the outer end portion of the planarization film 105 is covered with the sealant 107; in a portion where at least the planarization film 105 and the sealant 107 overlap with each other, the moisture impermeable layer 109 is formed between the planarization film 105 and the sealant 107. With such a structure, water can be inhibited from entering the planarization film 105 from the sealant 107, which makes it possible to obtain sealing capability expected from the moisture permeability of the sealant 107 and the width of a portion sealed with the sealant 107. Although the moisture impermeable layer 109 is provided only in a portion where the sealant 107 and the planarization film 105 substantially overlap with each other in FIG. 3B, the moisture impermeable layer 109 may be formed on the entire surface of the substrate. When the moisture impermeable layer 109 is formed on the entire surface, steps of patterning, etching, and the like are not needed, resulting in simplification of the manufacturing process. On the other hand, by removing the moisture impermeable layer 109 in an effective display area as illustrated in FIG. 3B, deterioration of display quality due to the refractive index, coloring, or the like of the moisture impermeable layer 109 can be reduced.

Figure 3C:
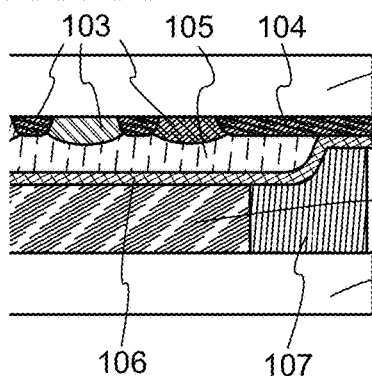

FIG. 3C corresponds to FIG. 1C. In a structure in FIG. 3C, part (only the black matrix 104) of a resin layer (the color filters 103, the black matrix 104, and the planarization film 105) is exposed to the outside atmosphere. An outer end portion of the planarization film 105 is on an inner side than the outer peripheries of the substrates; the moisture impermeable layer 106 is formed between the resin layer and the liquid crystal layer 102 and between the resin layer and the sealant 107. Since only the black matrix 104 is exposed to the outside atmosphere in the resin layer, the amount of water entering from the outside atmosphere can be minimized. Further, the black matrix 104 which is formed to extend to end portions of the substrates makes it possible to inhibit decrease in display quality caused by light leakage of a backlight or entry of external light.

Figure 3D:
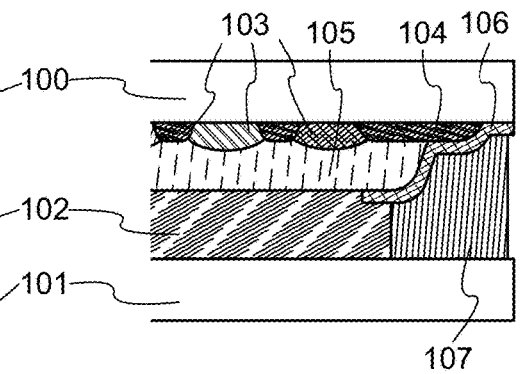

FIG. 3D corresponds to FIG. 1D. In a structure in FIG. 3D, an outer end portion of a resin layer (the color filters 103, the black matrix 104, and the planarization film 105) is on an inner side than the outer peripheries of the substrates, and the sealant 107 is on an outer side than the outer end portion of the resin layer; thus, the resin layer is not exposed to the outside atmosphere, resulting in a structure that is less likely to be affected by water. Further, the moisture impermeable layer 106 is formed at least in a portion where the resin layer and the sealant 107 overlap with each other to inhibit an adverse effect of water which enters the resin layer from the sealant 107. Note that although the moisture impermeable layer 106 is provided only in a portion where the sealant 107 and the resin layer substantially overlap with each other, the moisture impermeable layer 106 may be formed on the entire surface of the substrate. When the moisture impermeable layer 106 is formed on the entire surface, steps of patterning, etching, and the like are not needed, resulting in simplification of the manufacturing process. On the other hand, by removing the moisture impermeable layer 106 in an effective display area as illustrated in FIG. 3D, deterioration of display quality due to a difference in the refractive indexes, coloring, or the like of the moisture impermeable layer 106 can be reduced.

Although the moisture impermeable layer 106 is formed to cover both an outer end portion of the planarization film 105 and an outer end portion of the black matrix 104 after the planarization film 105 is formed, a moisture impermeable layer covering the outer end portion of the black matrix 104 and a moisture impermeable layer covering the outer end portion of the planarization film 105 may be formed independently.

Further, since the black matrix 104 is formed not extend to end portions of the substrates in the structure in FIG. 3D, display quality might be decreased due to light leakage from a backlight or entry of external light in the case of a liquid crystal display device with a reduced frame width. In such a case, by mixing a colorant or a pigment into the sealant 107 to color the sealant 107 in deep color, an adverse effect caused by light leakage or external light can be reduced; thus, the display quality can be maintained.

Figure 3E:
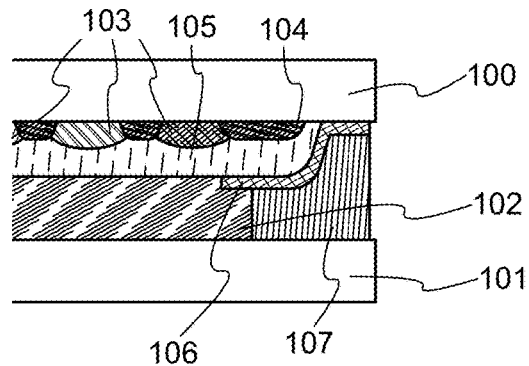

FIG. 3E corresponds to FIG. 1E. In a structure in FIG. 3E, an outer end portion of a resin layer (the color filters 103, the black matrix 104, and the planarization film 105) is on an inner side than the outer peripheries of the substrates, and the sealant 107 is on an outer side than the outer end portion of the resin layer; thus, the resin layer is not exposed to the outside atmosphere, resulting in a structure that is less likely to be affected by water. Further, the moisture impermeable layer 106 is formed at least in a portion where the resin layer and the sealant 107 overlap with each other to inhibit an adverse effect of water which enters the resin layer from the sealant 107. In the structure in FIG. 3E, an outer end portion of the black matrix 104 is on an inner side than an outer end portion of the planarization film 105, and thus the black matrix 104 is covered with the planarization film 105. Note that although the moisture impermeable layer 106 is provided only in a portion where the sealant 107 and the resin layer substantially overlap with each other, the moisture impermeable layer 106 may be formed on the entire surface of the substrate. When the moisture impermeable layer 106 is formed on the entire surface, steps of patterning, etching, and the like are not needed, resulting in simplification of the manufacturing process. On the other hand, by removing the moisture impermeable layer 106 in an effective display area as illustrated in FIG. 3E, deterioration of display quality due to the refractive index, coloring, or the like of the moisture impermeable layer 106 can be reduced.

Further, since the black matrix 104 is formed not extend to end portions of the substrates in the structure in FIG. 3E, display quality might be decreased due to light leakage from a backlight or entry of external light in the case of a liquid crystal display device with a reduced frame width. In such a case, by mixing a colorant or a pigment into the sealant 107 to color the sealant 107 in deep color, an adverse effect caused by light leakage or external light can be reduced; thus, the display quality can be maintained.

The structure in any of FIGS. 3D and 3E in which the outer end portion of the black matrix 104 is on an inner side than the end portions of the substrates of the liquid crystal display device increases resistance to ESD. This makes it possible to provide a highly reliable and highly durable liquid crystal display device.

With the sealant 107 having a width longer than or equal to 0.2 mm and shorter than or equal to 1.5 mm, preferably longer than or equal to 0.4 mm and shorter than or equal to 1 mm, sufficient sealing capability can be maintained for as long as is needed in a liquid crystal display device with any of the structures described in this embodiment, while reducing a frame width thereof.

The moisture impermeable layer in this embodiment refers to a material at least having lower moisture permeability than the sealant; the moisture impermeable layer may have a single-layer structure or a stacked-layer structure. Examples of a material preferable for the moisture impermeable layer are silicon nitride, silicon nitride oxide, aluminum nitride, and silicon oxide. Further, the examples can also include transparent conductive oxide. When the transparent conductive oxide is used for the moisture impermeable layer, the moisture impermeable layer and an electrode on the counter substrate side can be formed at the same time, which is preferable. Examples of the transparent conductive oxide are indium tin oxide (ITO), a conductive material in which zinc oxide (ZnO) is mixed with indium oxide, a conductive material in which silicon oxide ($SiO_2$) is mixed with indium oxide, organic indium, organotin, indium oxide containing tungsten oxide, indium zinc oxide containing tungsten oxide, indium oxide containing titanium oxide, indium tin oxide containing titanium oxide, and graphene; the transparent conductive oxide preferably has a sheet resistance of 10000 Ω/square or less and a light transmittance of 70% or higher on a wavelength of 550 nm.

The electrode 108, the electrode 160, and the electrode 161 each correspond to a pixel electrode or a common electrode. In the case of a transmissive liquid crystal display device, a pixel electrode layer, a common electrode layer, an element substrate, a counter substrate, and other components such as an insulating film and a conductive film, which are provided in a pixel region through which light is transmitted, have a property of transmitting light in the visible wavelength range. In a liquid crystal display device in a mode in which an electric field is applied in the horizontal direction, such as the IPS mode or the FFS mode, a pixel electrode layer and a common electrode layer preferably have a light-transmitting property; however, in the case of a liquid crystal display device having a structure in which a relatively large opening pattern is provided, a non-light-transmitting material such as a metal film may be used depending on its shape. Note that in this specification, a light-transmitting property refers to a property of transmitting at least light in the visible wavelength range.

On the other hand, in the case of a reflective liquid crystal display device, a reflective component which reflects light transmitted through a liquid crystal composition (e.g., a reflective film or substrate) may be provided on the side opposite to the viewing side of the liquid crystal composition. Therefore, a substrate, an insulating film, and a conductive film, which are provided between the viewing side and the reflective component and through which light is transmitted, have a property of transmitting light in the visible wavelength range. In a liquid crystal display device having a structure in which an electric field is applied in the vertical direction, a pixel electrode layer or a common electrode layer on the side opposite to the viewing side may have a light-reflecting property so that it can be used as a reflective component.

The pixel electrode layer and the common electrode layer can be formed using one or more of the following: indium tin oxide (ITO), a conductive material in which zinc oxide (ZnO) is mixed with indium oxide, a conductive material in which silicon oxide ($SiO_2$) is mixed with indium oxide, organic indium, organotin, indium oxide containing tungsten oxide, indium zinc oxide containing tungsten oxide, indium oxide containing titanium oxide, and indium tin oxide containing titanium oxide; graphene; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof. Further, the pixel electrode layer and the common electrode layer can be formed using a conductive composition containing a conductive high molecule (also referred to as a conductive polymer). As the conductive high molecule, what is called a π-electron conjugated conductive polymer can be used. For example, polyaniline or a derivative thereof, polypyrrole or a derivative thereof, polythiophene or a derivative thereof, and a copolymer of two or more kinds of them are given. The pixel electrode layer and the common electrode layer preferably have a sheet resistance of 10000 Ω/square or less and a light transmittance of 70% or higher on a wavelength of 550 nm. Further, the resistivity of the conductive high molecule contained in the conductive composition is preferably 0.1 Ω·cm or less. Materials and structures of the electrodes are selected depending on a display mode of the liquid crystal display device as described above; for example, a material or a structure which transmits or reflects light is selected as appropriate.

As the element substrates 101 and 151 and the counter substrates 100 and 150, a glass substrate of barium borosilicate glass, aluminoborosilicate glass, or the like, a quartz substrate, a plastic substrate, or the like can be used. Note that in the case of the reflective liquid crystal display device, a metal substrate such as an aluminum substrate or a stainless steel substrate may be used as a substrate on the side opposite to the viewing side.

Note that an optical film such as a polarizing plate, a retardation plate, or an anti-reflection film may be provided as appropriate. In addition, a backlight or the like can be used as a light source.

The structures, methods, and the like described in this embodiment can be combined as appropriate with any of the other structures, methods, and the like described in the other embodiments.

Embodiment 2

As the liquid crystal display device of one embodiment of the present invention, a passive matrix liquid crystal display device and an active matrix liquid crystal display device can be provided. In this embodiment, an example of an active matrix liquid crystal display device of one embodiment of the present invention is described with reference to FIGS. 4A and 4B.

Figure 4A:
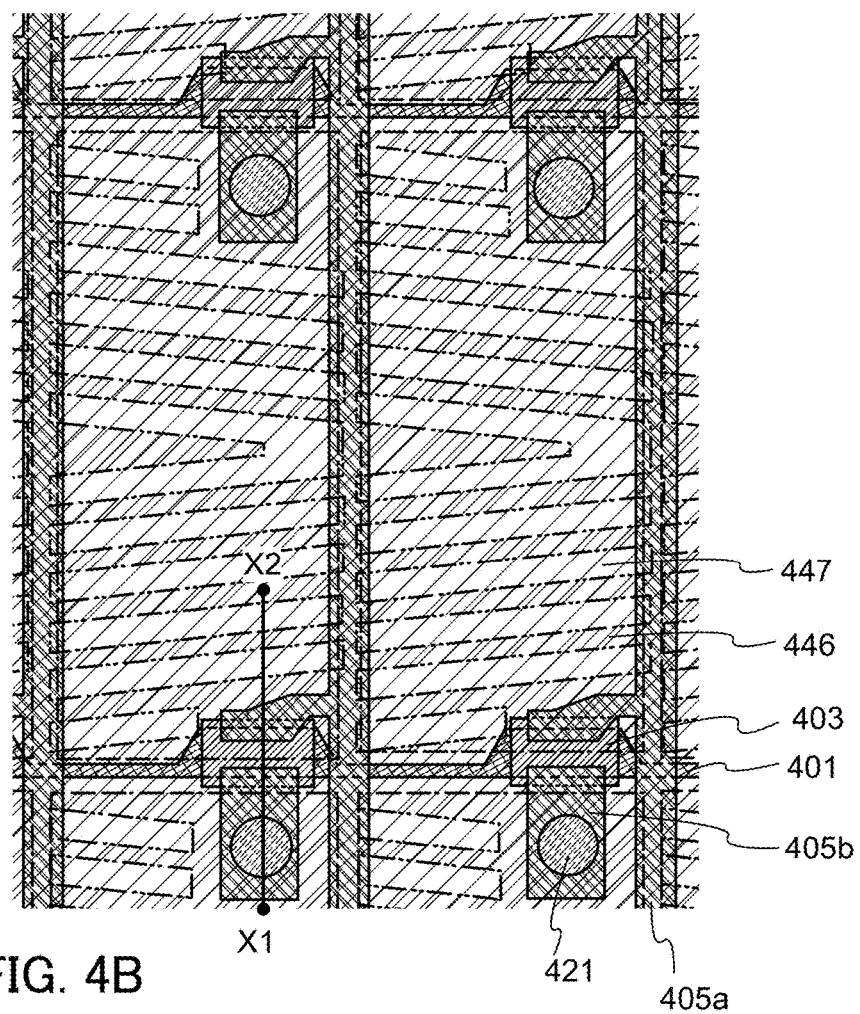
FIGS. 4A and 4B illustrate a liquid crystal element.
Figure 4B:
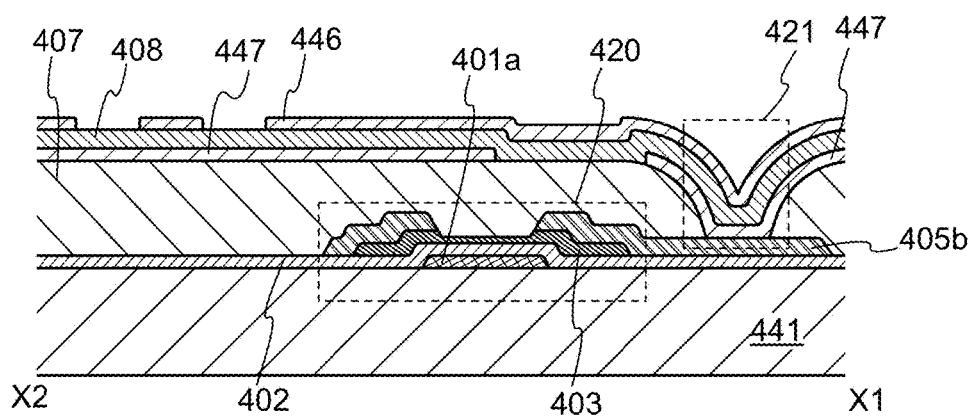

FIG. 4A is a plan view of the liquid crystal display device and illustrates two pixels. FIG. 4B is a cross-sectional view taken along line X1-X2 of FIG. 4A.

In FIG. 4A, a plurality of wirings 405a are arranged in parallel with each other (extend in the vertical direction of the drawing) and apart from each other. The wirings 405a serve as source wirings. Wiring layer 405b is formed using a conductive layer which is also used to form the wirings 405a. A plurality of wirings 401 extend in the direction substantially perpendicular to the wirings 405a (in the horizontal direction in the drawing) and are arranged apart from each other. The wirings 401 serve as gate wirings. A first electrode layer 447 is provided in a substantially rectangular region surrounded by the wirings 405a and the wirings 401. The first electrode layer 447 serves as a pixel electrode. In FIG. 4A, a transistor 420 which drives the pixel electrode is provided in the upper right corner of a substantially rectangular region surrounded by the wirings 405a and the wirings 401. A plurality of pixel electrodes and a plurality of transistors are arranged in matrix.

In the liquid crystal display device in FIGS. 4A and 4B, the first electrode layer 447 electrically connected to the transistor 420 through a contact hole 421 serves as the pixel electrode, and a second electrode layer 446 overlapping with the first electrode layer 447 with an insulating film 408 provided therebetween serves as a common electrode. A common potential is applied to a common electrode layer.

There is no particular limitation on arrangement of the electrodes, and a method in which a liquid crystal molecule is driven by generating a fringe electric field to control gray scale, such as the FFS mode illustrated in FIGS. 3A to 3E, can be used. In addition to such a method, a driving method using any of the electrode structures illustrated in FIG. 2A to 2E can be used as appropriate.

As a liquid crystal composition used for a liquid crystal layer, a liquid crystal composition suitable for each driving method can be used as appropriate.

Having an opening pattern, the second electrode layer 446 is illustrated as divided electrode layers in the cross-sectional view of FIG. 4B. The same applies to the other drawings of this specification.

There is no particular limitation on a structure of a transistor which can be used for the liquid crystal display device disclosed in this specification; for example, a staggered type or a planar type having a top-gate structure or a bottom-gate structure can be used. Further, the transistor may have a single gate structure including one channel formation region, or a multi gate structure such as a double gate structure including two channel formation regions or a triple gate structure including three channel formation regions. Alternatively, the transistor may have a dual-gate structure including two gate electrode layers positioned above and below a channel region with a gate insulating layer provided therebetween.

The transistor 420 illustrated in FIGS. 4A and 4B is an inverted staggered thin film transistor. The transistor 420 is formed over a first substrate 441 having an insulating surface, and includes a gate electrode 401*a*, a gate insulating layer 402, a semiconductor layer 403, and the wiring layer 405*b* which serves as one of a source electrode and a drain electrode. In addition, an insulating film 407 is stacked to cover the transistor 420. The insulating film 407 may have a single-layer structure or a stacked-layer structure.

The first substrate 441 and a second substrate (not illustrated) which is a counter substrate are firmly attached to each other with a sealant with the liquid crystal layer sandwiched therebetween. A peripheral structure of the sealant is similar to that described in Embodiment 1. As a method for forming the liquid crystal layer, a dispenser method (a dropping method) or an injection method in which a liquid crystal composition is injected using capillary action or the like after the first substrate 441 is attached to the second substrate can be used.

As the sealant, typically, a visible light curable resin, a UV curable resin, or a thermosetting resin is preferably used. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealant. In the case where a black matrix is formed not to extend to end portions of the substrates, a colorant or a pigment is preferably mixed into the sealant to color the sealant in deep color.

In the case where a photocurable resin such as a UV curable resin is used as the sealant and the liquid crystal composition is formed by a dropping method, for example, the sealant may be cured through a light irradiation step of a polymer stabilization treatment.

In this embodiment, the outside of the first substrate 441 and the outside of the second substrate (the counter substrate) may be each provided with a polarizing plate. In addition to the polarizing plate, an optical film such as a retardation plate or an anti-reflection film may be provided. For example, circular polarization by the polarizing plate and the retardation plate may be used. Through the above-described process, a liquid crystal display device can be completed.

In the case of manufacturing a plurality of liquid crystal display devices using a large-sized substrate (in the case of a multiple panel method), a division step can be performed before the polymer stabilization treatment or before the polarizing plate is provided. In consideration of the influence of the division step on the liquid crystal composition (such as alignment disorder due to force applied in the division step), it is preferable that the division step be performed after the first substrate is attached to the second substrate and before the polymer stabilization treatment.

Although not illustrated, a backlight, a sidelight, or the like may be used as a light source. Light from the light source is emitted from the side of the first substrate 441 which is an element substrate so as to pass through the second substrate on the viewing side.

Any of the materials similar to those of the electrode 108 described in Embodiment 1 can be used for the first electrode layer 447 and the second electrode layer 446. Materials and structures of the electrode layers are selected depending on a display mode of the liquid crystal display device or a liquid crystal display module as described above; for example, a material or a structure which transmits or reflects light is selected as appropriate.

An insulating film serving as a base film may be provided between the first substrate 441 and the wirings 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, and a silicon oxynitride film. The wirings 401 can be formed to have a single-layer structure or a stacked-layer structure using a metal material such as molybdenum, titanium, chromium, tantalum, tungsten, aluminum, copper, neodymium, or scandium or an alloy material which contains any of these materials as its main component. Alternatively, a semiconductor film typified by a polycrystalline silicon film doped with an impurity element such as phosphorus, or a silicide film such as a nickel silicide film may be used for the wirings 401. By using a light-blocking conductive film for the wirings 401, light from a backlight (light emitted through the first substrate 441) can be prevented from entering the semiconductor layer 403.

The gate insulating layer 402 can be formed using a silicon oxide film, a gallium oxide film, an aluminum oxide film, a silicon nitride film, a silicon oxynitride film, an aluminum oxynitride film, or a silicon nitride oxide film by a plasma CVD method, a sputtering method, or the like. Alternatively, a high-k material such as hafnium oxide, yttrium oxide, lanthanum oxide, hafnium silicate, hafnium aluminate, hafnium silicate to which nitrogen is added, or hafnium aluminate to which nitrogen is added may be used as a material of the gate insulating layer 402. The use of such a high-k material enables a reduction in gate leakage current.

A material of the semiconductor layer 403 is not particularly limited and may be determined as appropriate in accordance with characteristics needed for the transistor 420. Examples of the material which can be used for the semiconductor layer 403 are described.

The semiconductor layer 403 can be formed using the following material: an amorphous semiconductor formed by a sputtering method or a vapor-phase growth method using a semiconductor source gas typified by silane or germane; a polycrystalline semiconductor formed by crystallizing the amorphous semiconductor with the use of light energy or thermal energy; a microcrystalline semiconductor; or the like. The semiconductor layer can be formed by a sputtering method, an LPCVD method, a plasma CVD method, or the like.

A typical example of the amorphous semiconductor is hydrogenated amorphous silicon, and a typical example of a crystalline semiconductor is polysilicon and the like. Polysilicon (polycrystalline silicon) includes high-temperature polysilicon which is formed at process temperature of 800°

C. or higher, low-temperature polysilicon which is formed at process temperature of 600° C. or lower, polysilicon which is formed by crystallizing amorphous silicon with the use of an element or the like promoting crystallization, and the like. Needless to say, as described above, a microcrystalline semiconductor, or a semiconductor which includes a crystalline phase in part of a semiconductor layer can be used.

Further, the semiconductor layer 403 can be formed using an oxide semiconductor. As the oxide semiconductor, for example, any of the following can be used: indium oxide; tin oxide; zinc oxide; two-component metal oxides such as an In—Zn-based oxide, a Sn—Zn-based oxide, an Al—Zn-based oxide, a Zn—Mg-based oxide, a Sn—Mg-based oxide, an In—Mg-based oxide, and an In—Ga-based oxide; three-component metal oxides such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, and an In—Lu—Zn-based oxide; and four-component metal oxides such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide. In addition, any of the above oxide semiconductors may contain an element other than In, Ga, Sn, and Zn, for example, $SiO_2$.

Here, for example, an In—Ga—Zn—O-based oxide semiconductor means an oxide semiconductor containing indium (In), gallium (Ga), and zinc (Zn), and there is no limitation on the composition thereof.

An oxide semiconductor film may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a c-axis aligned crystalline oxide semiconductor (CAAC-OS).

For example, an oxide semiconductor film may include a CAAC-OS. In the CAAC-OS, for example, c-axes are aligned, and a-axes and/or b-axes are not macroscopically aligned.

For example, an oxide semiconductor film may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example.

For example, an oxide semiconductor film may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that an oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked structure including a region of an amorphous oxide semiconductor, a region of a microcrystalline oxide semiconductor, and a region of a CAAC-OS, for example.

Note that an oxide semiconductor film may be in a single-crystal state, for example.

An oxide semiconductor film preferably includes a plurality of crystal parts. In each of the crystal parts, a c-axis is preferably aligned in a direction parallel to a normal vector of a surface where the oxide semiconductor film is formed or a normal vector of a surface of the oxide semiconductor film. Note that among crystal parts, the directions of the a-axis and the b-axis of one crystal part may be different from those of another crystal part. An example of such an oxide semiconductor film is a CAAC-OS film.

Note that in most cases, a crystal part in the CAAC-OS film fits inside a cube whose one side is less than 100 nm. In an image obtained with a transmission electron microscope (TEM), a boundary between crystal parts in the CAAC-OS film is not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, the c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that among crystal parts, the directions of the a-axis and the b-axis of one crystal part may be different from those of another crystal part. In this specification, the term "perpendicular" includes a range from 80° to 100°, preferably from 85° to 95°. In addition, the term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from the surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, crystallinity of the crystal part in a region to which the impurity is added is lowered in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

With the use of the CAAC-OS film in a transistor, change in electrical characteristics of the transistor due to irradiation with visible light or ultraviolet light is small. Thus, the transistor has high reliability.

The oxide semiconductor layer may have a stacked-layer structure. Description is given of an oxide semiconductor layer having a three-layer structure below; however, the number of stacked layers is not limited to three.

A first oxide semiconductor layer and a third oxide semiconductor layer each contain one or more of elements included in a second oxide semiconductor layer. Thus, DOS is less likely to be formed at the interface between the first oxide semiconductor layer and the second oxide semiconductor layer and the interface between the second oxide semiconductor layer and the third oxide semiconductor layer.

An oxide with high carrier mobility may be used for the second oxide semiconductor layer. An oxide containing indium, a Zn—Sn oxide, or a Ga—Sn oxide is preferably used. Further, the second oxide semiconductor layer preferably contains an element whose bonding energy with oxygen is high. Examples of such an element are aluminum, gallium, and yttrium. An oxide containing such an element can have a large band gap. Furthermore, the second oxide semiconductor layer preferably contains zinc. An oxide containing zinc is easily crystallized.

When an In-M-Zn oxide (M is the element whose bonding energy with oxygen is high) is used for the first oxide semiconductor layer, the atomic ratio of In to M is preferably as follows: the atomic percentage of In is lower than 50 atomic % and the atomic percentage of M is higher than or equal to 50 atomic %, further preferably the atomic percentage of In is lower than 25 atomic % and the atomic percentage of M is higher than or equal to 75 atomic %. When an In-M-Zn oxide is used for the second oxide semiconductor layer, the atomic ratio of In to M is preferably as follows: the atomic percentage of In is higher than or equal to 25 atomic % and the atomic percentage of M is lower than 75 atomic %, further preferably the atomic percentage of In is higher than or equal to 34 atomic % and the atomic percentage of M is lower than 66 atomic %. When an In-M-Zn oxide is used for the third oxide semiconductor layer, the atomic ratio of In to M is preferably as follows: the percentage of In is lower than 50 atomic % and the percentage of M is higher than or equal to 50 atomic %, further preferably, the percentage of In is lower than 25 atomic % and the percentage of M is higher than or equal to 75 atomic %. Note that values of the above atomic ratio of In to M are obtained when summation of In and M is assumed to be 100 atomic %. Note that an oxide used for the first oxide semiconductor layer and an oxide used for the third oxide semiconductor layer may have the same compositions.

In the case of forming the first oxide semiconductor layer by a sputtering method, the atomic ratio of a target may be In:M:Zn=1:1:0.5, 1:1:1, 1:1:2, 1:3:1, 1:3:2, 1:3:4, 1:3:6, 1:6:2, 1:6:4, 1:6:6, 1:6:8, 1:6:10, 1:9:2, 1:9:4, 1:9:6, 1:9:8, or 1:9:10, for example.

In the case of forming the second oxide semiconductor layer by a sputtering method, the atomic ratio of a target may be In:M:Zn=3:1:1, 3:1:2, 3:1:4, 1:1:0.5, 1:1:1, or 1:1:2, for example.

In the case of forming the third oxide semiconductor layer by a sputtering method, the atomic ratio of a target may be In:M:Zn=1:1:0.5, 1:1:1, 1:1:2, 1:3:1, 1:3:2, 1:3:4, 1:3:6, 1:6:2, 1:6:4, 1:6:6, 1:6:8, 1:6:10, 1:9:2, 1:9:4, 1:9:6, 1:9:8, or 1:9:10, for example.

When any of the semiconductor layers is formed by a sputtering method, a film whose atomic ratio is slightly different from that of the target is formed in some cases. In particular, the atomic percentage of zinc in the film becomes smaller than that in the target in some cases. Specifically, the atomic percentage of zinc in the film is higher than or equal to approximately 40% and lower than or equal to approximately 90% of that of zinc in the target in some cases.

In a process of forming the semiconductor layer and the wiring layer, an etching step is employed to process thin films into desired shapes. Dry etching or wet etching can be used for the etching step.

Etching conditions (such as an etchant, etching time, and temperature) are appropriately adjusted depending on a material so that the material can be etched into a desired shape.

As a material of the wiring layer 405b serving as source and drain electrode layers, an element selected from Al, Cr, Ta, Ti, Mo, and W; an alloy containing any of the above elements as its component; an alloy film containing a combination of any of the above elements; and the like can be used. Further, in the case where heat treatment is performed in the following process, a conductive film with heat resistance against the heat treatment is preferably used. For example, since use of Al alone brings disadvantages such as poor resistance to heat and a tendency to corrosion, Al is used in combination with a conductive material having heat resistance. As the conductive material having heat resistance, which is combined with Al, it is possible to use an element selected from titanium (Ti), tantalum (Ta), tungsten (W), molybdenum (Mo), chromium (Cr), neodymium (Nd), and scandium (Sc), or nitride containing any of these elements as its component, or it is possible to use a stacked-layer structure including Al and any of these elements.

Note that an insulating film may be provided between the wiring layer 405b and the semiconductor layer 403. The insulating film can serve as a channel protective film. The channel protective film may be formed only over a channel formation region, or may be formed in a region other than an opening portion where the wiring layer 405b and the semiconductor layer 403 are in contact with each other.

As the insulating film 407 covering the transistor 420, an inorganic insulating film or an organic insulating film formed by a dry method or a wet method can be used. For example, a silicon nitride film, a silicon oxide film, a silicon oxynitride film, an aluminum oxide film, or a tantalum oxide film, which is formed by a CVD method, a sputtering method, or the like can be used. Alternatively, an organic material such as polyimide, acrylic, a benzocyclobutene-based resin, polyamide, or epoxy can be used. Other than such organic materials, it is possible to use a low-dielectric constant material (a low-k material), a siloxane-based resin, phosphosilicate glass (PSG), borophosphosilicate glass (BPSG), or the like. A gallium oxide film may be used as the insulating film 407.

Note that the insulating film 407 may be formed by stacking a plurality of insulating films formed using any of these materials. For example, such a structure in which an organic resin film is stacked over an inorganic insulating film may be employed.

By employing a sealing structure of any of the structures described in Embodiment 1 for a liquid crystal display device or a liquid crystal display module having such a structure, a highly reliable liquid crystal display module or liquid crystal display device can be provided.

The structures, methods, and the like described in this embodiment can be combined as appropriate with any of the other structures, methods, and the like described in the other embodiments.

Embodiment 3

In this embodiment, an example of a liquid crystal display panel (liquid crystal display module) with the sealing structure described in Embodiment 1 is described. In this embodiment, description is given of a liquid crystal display panel (liquid crystal display module) in which some or all of driver circuits including transistors and a pixel portion are formed in one substrate; however, it is not limited thereto, and all of the driver circuits may be provided externally or may be formed over one substrate. Although not illustrated, a sensor or a touchscreen may be provided. For example, an in-cell touch sensor may be built in by using the second electrode layer 446 or the like serving as a common electrode as an electrode for the touch sensor.

Figure 5A:
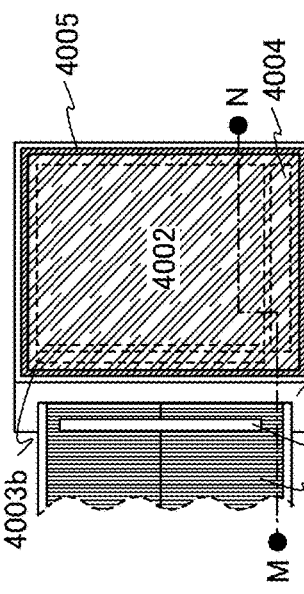
FIGS. 5A and 5B illustrate a liquid crystal display panel (liquid crystal display module).
Figure 5B:
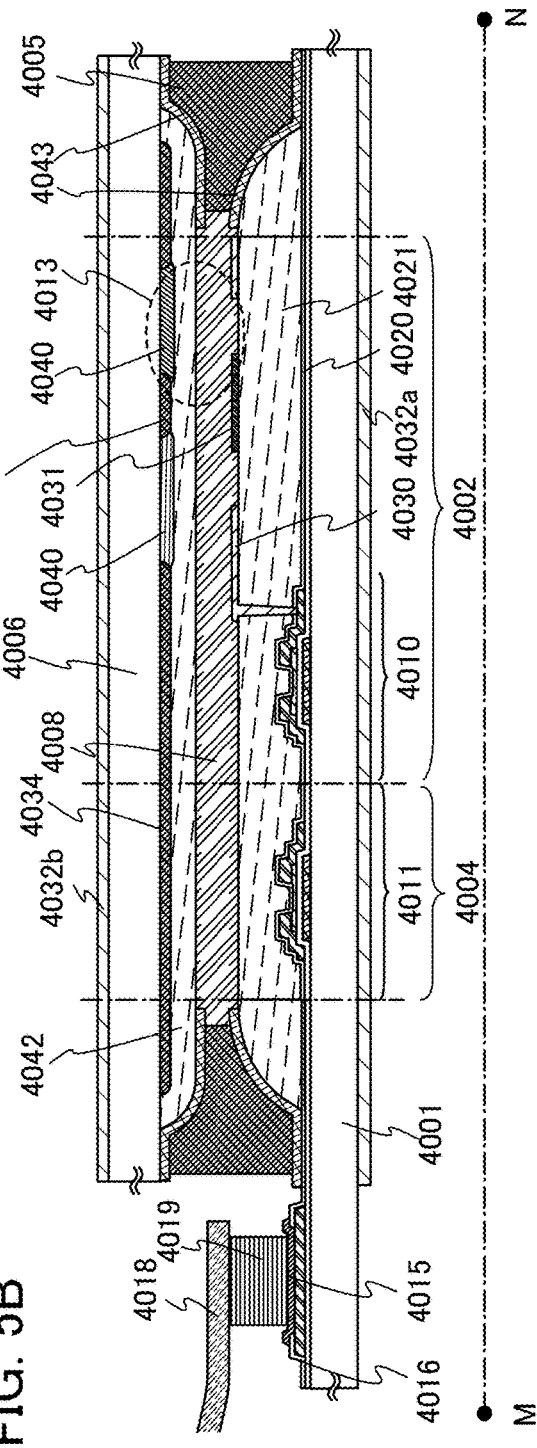

The appearance and a cross section of a liquid crystal display panel (liquid crystal display module), which is an embodiment of a liquid crystal display device, are described with reference to FIGS. 5A and 5B. FIG. 5A is a top view of a panel in which transistors 4010 and 4011 formed over a first substrate 4001 and a liquid crystal element 4013 are sealed in a space between the first substrate 4001 and a second substrate 4006 with the use of a sealant 4005. FIG. 5B is a cross-sectional view taken along the line M-N of FIG. 5A.

The sealant 4005 is provided to surround a pixel portion 4002 and a scan line driver circuit 4004 which are provided over the first substrate 4001, and the second substrate 4006 is provided over the pixel portion 4002 and the scan line driver circuit 4004. The pixel portion 4002, the scan line driver circuit 4004, and a liquid crystal layer 4008 are sealed in a space between the first substrate 4001 and the second substrate 4006 with the use of the sealant 4005. Outer end portions of a black matrix 4041, color filters 4040, a planarization film 4042, and the like are formed on an inner side than end portions of the first substrate 4001 and the second substrate 4006, and the sealant 4005 is formed on an outer side than the outer end portions of the black matrix 4041, the color filters 4040, the planarization film 4042, and the like; thus, entry of water through a resin layer is inhibited. In addition, to secure a sufficient width of a portion sealed with the sealant, part of the sealant 4005 overlaps with the resin layer. For this reason, a moisture impermeable layer 4043 is formed between the resin layer and the sealant 4005 to prevent the loss of sealing capability due to entry of water from the sealant 4005 to the resin layer. Note that this structure is an example, and with the use of any of the other sealing structures described in Embodiment 1, a highly reliable liquid crystal display panel (liquid crystal display module) in which an adverse effect of water is inhibited can be provided.

Note that in the case where an interlayer film 4021 over the first substrate 4001 is also formed using a resin material, a structure similar to that of the second substrate 4006 side is employed for the first substrate 4001 side; thus, a liquid crystal display module (liquid crystal display panel) with favorable durability can be provided.

Further, FIG. 5A illustrates the liquid crystal display panel (liquid crystal display module) in which a signal line circuit formed of a single crystal semiconductor or a polycrystalline semiconductor is provided in a region different from a region which is over the first substrate 4001 and is surrounded by the sealant 4005. Note that in FIG. 5A, another signal line driver circuit is formed using a transistor provided over the first substrate 4001. That is, a signal line driver circuit 4003a formed using a single crystal semiconductor or a polycrystalline semiconductor is provided, and a signal line driver circuit 4003b is mounted over the first substrate 4001.

Note that the connection method of a driver circuit which is separately formed is not particularly limited, and a COG method, a wire bonding method, a TAB method, or the like can be used. FIG. 5A illustrates an example where the signal line driver circuit 4003a is provided by a TAB method.

The pixel portion 4002 and the scan line driver circuit 4004 provided over the first substrate 4001 include a plurality of transistors. FIG. 5B illustrates the transistor 4010 included in the pixel portion 4002 and the transistor 4011 included in the scan line driver circuit 4004, as an example. An insulating layer 4020 and the interlayer film 4021 are provided over the transistors 4010 and 4011.

As the transistors 4010 and 4011, the transistor which is described in Embodiment 2 can be used.

Further, a conductive layer may be provided over the interlayer film 4021 or the insulating layer 4020 so as to overlap with a channel formation region of a semiconductor layer of the transistor 4011 for the driver circuit. The conductive layer and a gate electrode layer of the transistor 4011 may have the same potential or different potentials, and the conductive layer can serve as a second gate electrode layer. The potential of the conductive layer may be GND or 0 V, or the conductive layer may be in a floating state.

A pixel electrode layer 4030 and a common electrode layer 4031 are formed over the interlayer film 4021, and the pixel electrode layer 4030 is electrically connected to the transistor 4010. The liquid crystal element 4013 includes the pixel electrode layer 4030, the common electrode layer 4031, and the liquid crystal layer 4008. Note that a polarizing plate 4032a is provided on the outer side of the first substrate 4001 and a polarizing plate 4032b is provided on the outer side of the second substrate 4006.

A liquid crystal composition appropriate for a display mode is used for the liquid crystal layer 4008.

FIGS. 5A and 5B illustrate the liquid crystal display panel (liquid crystal display module) having a structure in which a liquid crystal of the liquid crystal layer 4008 is controlled by generating an electric field between the pixel electrode layer 4030 and the common electrode layer 4031 (i.e., the IPS mode). In this structure, an electric field in the horizontal direction is formed in the liquid crystal, so that liquid crystal molecules can be controlled using the electric field.

As the first substrate 4001 and the second substrate 4006, glass, plastic, or the like having a light-transmitting property can be used. Examples of the plastic are a fiber reinforced plastic (FRP) plate, a polyvinyl fluoride (PVF) film, a polyester film, and an acrylic resin film. Further, a sheet with a structure in which aluminum foil is sandwiched between PVF films or polyester films can be used.

Although FIGS. 5A and 5B illustrate an example of a transmissive liquid crystal display device, one embodiment of the present invention can also be used in a semi-transmissive liquid crystal display device or a reflective liquid crystal display device.

FIGS. 5A and 5B illustrate the liquid crystal display device in which the polarizing plates are provided on the outer side (the view side) of the pair of substrates; however, the polarizing plates may be provided on the inner side of the pair of substrates. The position of the polarizing plates may be determined as appropriate depending on the material of the polarizing plates and conditions of the manufacturing process. Further, a light-blocking layer serving as a black matrix may be provided. Furthermore, although not illustrated, the module may be integrated with a touch panel, or an in-cell touch screen structure may be further employed.

A color filter layer or a light-blocking layer may be formed as part of the interlayer film 4021. In FIGS. 5A and 5B, a light-blocking layer 4034 is provided on the second substrate 4006 side to cover the transistors 4010 and 4011. With the light-blocking layer 4034, the contrast can be more increased and the transistors can be more stabilized.

The transistors may be covered with the insulating layer 4020 serving as a protective film of the transistors; however, one embodiment of the present invention is not particularly limited to such a structure.

Note that the protective film is provided to prevent entry of contamination impurities floating in the air, such as an organic substance, a metal substance, or moisture, and is preferably a dense film. The protective film may be formed by a sputtering method to have a single-layer structure or a stacked-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Furthermore, in the case of further forming a light-transmitting insulating layer as a planarizing insulating film, the light-transmitting insulating layer can be formed using an organic material having heat resistance, such as polyimide, acrylic, a benzocyclobutene-based resin, polyamide, or epoxy. Other than such organic materials, it is possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed using these materials.

Materials similar to those of the pixel electrode layer and the common electrode layer described in Embodiment 2 can be used for the pixel electrode layer 4030 and the common electrode layer 4031. The materials are selected depending on a display mode of the liquid crystal display device as described above; for example, a material or a structure which transmits or reflects light is selected as appropriate.

Furthermore, a variety of signals and potentials are supplied from an FPC 4018 to the signal line driver circuit which is formed separately, the scan line driver circuit 4004, or the pixel portion 4002.

Since the transistor is easily broken due to static electricity or the like, a protection circuit for protecting the driver circuits is preferably provided over the same substrate as a gate line or a source line. The protection circuit is preferably formed using a nonlinear element.

In FIGS. 5A and 5B, a connection terminal electrode 4015 is formed using the same conductive film as that of the pixel electrode layer 4030, and a terminal electrode 4016 is formed using the same conductive film as that of source and drain electrode layers of the transistors 4010 and 4011.

The connection terminal electrode 4015 is electrically connected to a terminal included in the FPC 4018 through an anisotropic conductive film 4019.

Although FIGS. 5A and 5B illustrate an example in which another signal line driver circuit is formed and mounted on the first substrate 4001, one embodiment of the present invention is not limited to this structure. Another scan line driver circuit may be formed and mounted, or only some of the signal line driver circuits or some of the scan line driver circuits may be separately formed and mounted.

In the liquid crystal display panel (liquid crystal display module) with such a structure, entry of water from the outside atmosphere can be inhibited; therefore, the liquid crystal display panel (liquid crystal display module) can have high reliability. In addition, the liquid crystal display panel (liquid crystal display module) can have high durability.

The structures, methods, and the like described in this embodiment can be combined as appropriate with any of the other structures, methods, and the like described in the other embodiments.

Embodiment 4

Examples of an electronic device using the above-described liquid crystal display device are television sets (also referred to as televisions or television receivers), monitors of computers or the like, digital cameras, digital video cameras, digital photo frames, mobile phone sets (also referred to as mobile phones or mobile phone devices), portable game machines, portable information terminals, audio reproducing devices, and large-sized game machines such as pachinko machines. Specific examples of these electronic devices are given below.

Figure 6A:
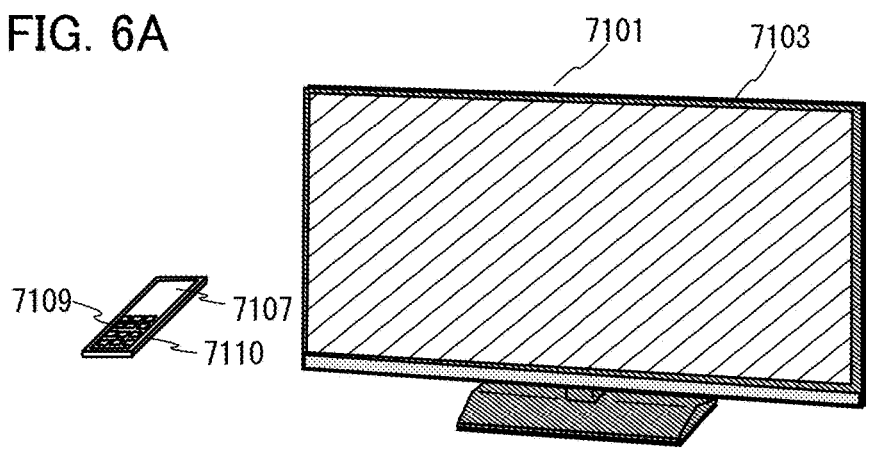
FIGS. 6A to 6D illustrate electronic devices.

FIG. 6A illustrates an example of a television set. In the television set, a display portion 7103 is incorporated in a housing 7101. In addition, here, the housing 7101 is supported by a stand 7105. The display portion 7103 can display images. The display portion 7103 has any of the sealing structures described in Embodiment 1. For this reason, the television set including the display portion 7103 can have high durability.

The television set can be operated with an operation switch of the housing 7101 or a separate remote controller 7110. With an operation pad 7109 of the remote controller 7110, channels and volume can be controlled and images displayed on the display portion 7103 can be controlled. Furthermore, the remote controller 7110 may be provided with a display portion 7107 for displaying data output from the remote controller 7110.

Note that the television set is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) information communication can be performed.

Figure 6B:
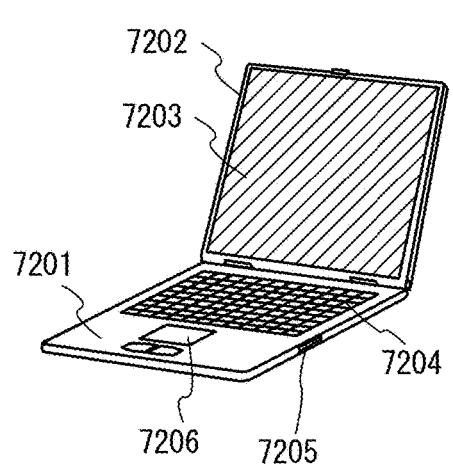

FIG. 6B illustrates a computer including a main body 7201, a housing 7202, a display portion 7203, a keyboard 7204, an external connection port 7205, a pointing device 7206, and the like. Note that in the computer, the display portion 7203 has any of the sealing structures described in Embodiment 1.

Figure 6C:
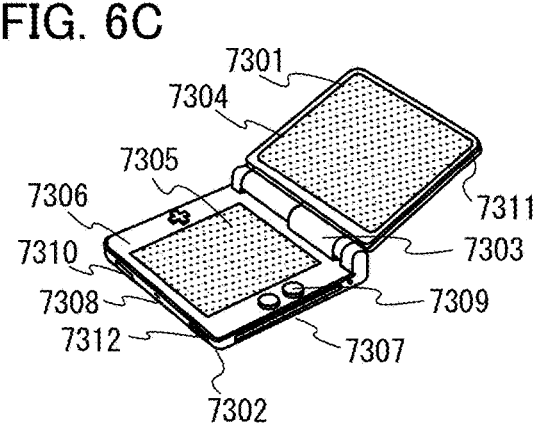

FIG. 6C illustrates a portable game machine including two housings, a housing 7301 and a housing 7302, which are connected with a joint portion 7303 so that the portable game machine can be opened or folded. A display portion 7304 is incorporated in the housing 7301. The display portion 7304 has any of the sealing structures described in Embodiment 1. A display portion 7305 is incorporated in the housing 7302. In addition, the portable game machine illustrated in FIG. 6C includes a speaker portion 7306, a recording medium insertion portion 7307, an LED lamp 7308, an input unit (an operation key 7309, a connection terminal 7310, a sensor 7311 (sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), or a microphone 7312), and the like. Needless to say, the structure of the portable game machine is not limited to the above as far as a display portion using the liquid crystal display device described in Embodiment 1 is used as at least either the display portion 7304 or the display portion 7305, or both, and the structure can include other accessories as appropriate. The portable game machine in FIG. 6C has a function of reading a program or data stored in a recording medium to display it in the display portion, and a function of sharing information with another portable game machine by wireless communication. Note that the functions of the portable game machine in FIG. 6C are not limited to these functions, and the portable game machine can have various functions. The above-described portable game machine including the display portion 7304 can have high durability because the display portion 7304 has any of the sealing structures described in Embodiment 1.

Figure 6D:
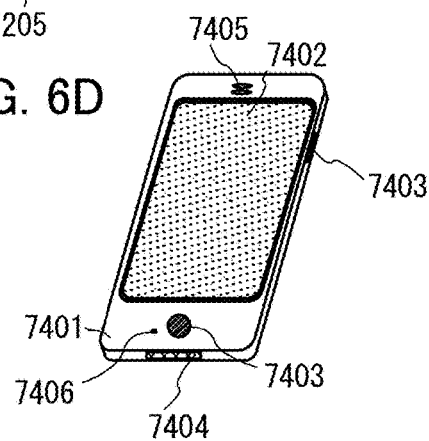

FIG. 6D illustrates an example of a mobile phone. The mobile phone is provided with a display portion 7402 incorporated in a housing 7401, operation buttons 7403, an external connection port 7404, a speaker 7405, a microphone 7406, and the like. Note that the display portion 7402 included in the mobile phone has any of the sealing structures described in Embodiment 1. Accordingly, the mobile phone that has the display portion 7402 including the liquid crystal element can have high durability.

When the display portion 7402 of the mobile phone illustrated in FIG. 6D is touched with a finger or the like, data can be input to the mobile phone. In this case, operations such as making a call and creating mail can be performed by touching the display portion 7402 with a finger or the like.

There are mainly three screen modes of the display portion 7402. The first mode is a display mode mainly for displaying an image. The second mode is an input mode mainly for inputting data such as characters. The third mode is a display-and-input mode in which two modes of the display mode and the input mode are combined.

For example, in the case of making a call or creating mail, a character input mode mainly for inputting characters is selected for the display portion 7402 so that characters displayed on the screen can be input. In this case, it is preferable to display a keyboard or number buttons on almost the entire screen of the display portion 7402.

When a detection device including a sensor for detecting an inclination, such as a gyroscope or an acceleration sensor, is provided inside the mobile phone, display on the screen of the display portion 7402 can be automatically changed by determining the orientation of the mobile phone (whether the mobile phone is placed horizontally or vertically for a landscape mode or a portrait mode).

The screen modes are changed by touch on the display portion 7402 or operation with the operation buttons 7403 of the housing 7401. The screen modes can be switched depending on the kind of images displayed on the display portion 7402. For example, when a signal of an image displayed on the display portion is a signal of moving image data, the screen mode is switched to the display mode. When the signal is a signal of text data, the screen mode is switched to the input mode.

Moreover, in the input mode, when input by touching the display portion 7402 is not performed within a specified period while a signal detected by an optical sensor in the display portion 7402 is detected, the screen mode may be controlled so as to be switched from the input mode to the display mode.

Figure 7A:
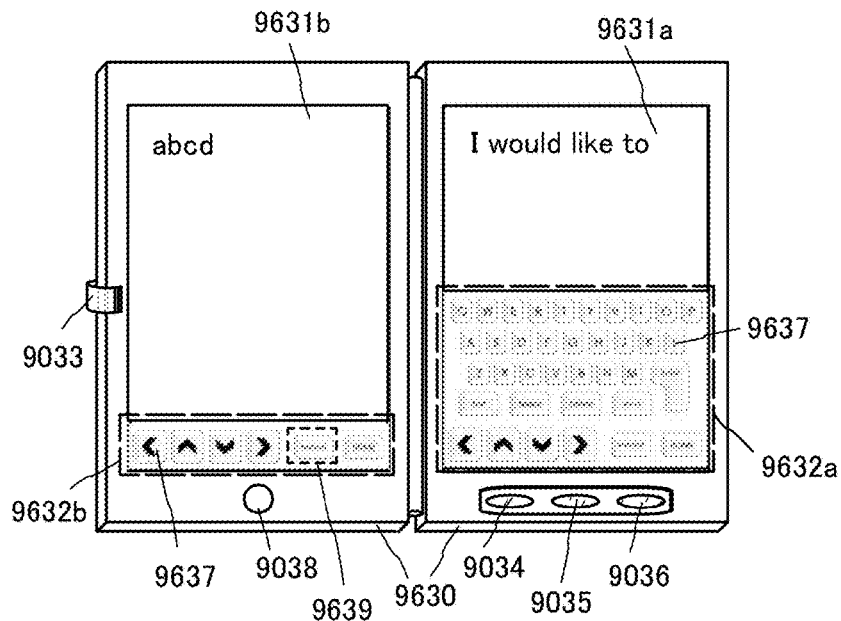
FIGS. 7A to 7C illustrate an electronic device.
Figure 7B:
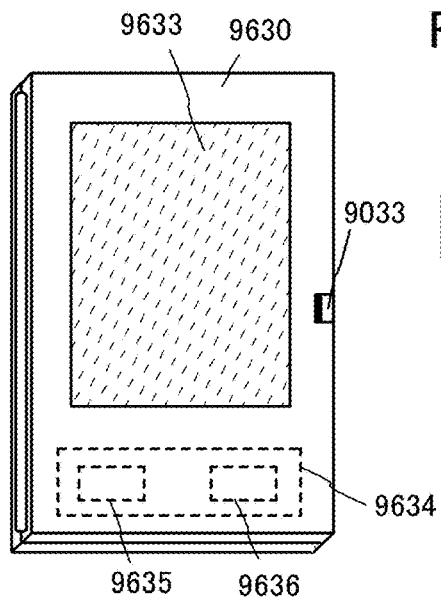

FIGS. 7A and 7B illustrate an example of a foldable tablet terminal. In FIG. 7A, the tablet terminal is unfolded, and includes a housing 9630, a display portion 9631a, a display portion 9631b, a display-mode switching button 9034, a power button 9035, a power-saving-mode switching button 9036, a clip 9033, and an operation button 9038. Note that in the tablet terminal, one or both of the display portion 9631a and the display portion 9631b are formed using a liquid crystal display device with any of the sealing structures described in Embodiment 1.

Part of the display portion 9631a can be a touchscreen region 9632a and data can be input when a displayed operation key 9637 is touched. Note that FIG. 7A illustrates, as an example, that half of the area of the display portion 9631a has only a display function and the other half of the area has a touchscreen function. However, the structure of the display portion 9631a is not limited to this, and all the area of the display portion 9631a may have the touchscreen function. For example, all the area of the display portion 9631a can display keyboard buttons and serve as a touchscreen while the display portion 9631b can be used as a display screen.

Like the display portion 9631a, part of the display portion 9631b can be a touchscreen region 9632b. When a keyboard display switching button 9639 displayed on the touchscreen is touched with a finger, a stylus, or the like, a keyboard can be displayed on the display portion 9631b.

Touch input can be performed in the touchscreen region 9632a and the touchscreen region 9632b at the same time.

The display-mode switching button 9034 can switch the display between portrait mode, landscape mode, and the like, and between monochrome display and color display, for example. With the power-saving-mode switching button 9036, the luminance of display can be optimized in accordance with the amount of external light at the time when the tablet is in use, which is detected with an optical sensor incorporated in the tablet. The tablet terminal may include another detection device such as a sensor for detecting an inclination (e.g., a gyroscope or an acceleration sensor) in addition to the optical sensor.

Although the display portion 9631a and the display portion 9631b have the same display area in FIG. 7A, one embodiment of the present invention is not limited to this example. The display portion 9631a and the display portion 9631b may have different areas or different display quality. For example, one of the display portions 9631a and 9631b may display higher definition images than the other.

FIG. 7B illustrates the tablet terminal which is folded. The tablet terminal includes the housing 9630, a solar cell 9633, a charge and discharge control circuit 9634, a battery 9635, and a DCDC converter 9636. As an example, FIG. 7B illustrates the charge and discharge control circuit 9634 including the battery 9635 and the DCDC converter 9636.

Since the tablet terminal is foldable, the housing 9630 can be closed when the tablet terminal is not used. As a result, the display portion 9631a and the display portion 9631b can be protected; thus, a tablet terminal which has excellent durability and excellent reliability in terms of long-term use can be provided.

The tablet terminal illustrated in FIGS. 7A and 7B can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar cell 9633, which is attached on the surface of the tablet terminal, supplies electric power to a touchscreen, a display portion, an image signal processor, and the like. Note that the solar cell 9633 is preferably provided on one or both surfaces of the housing 9630, in which case the battery 9635 can be charged efficiently.

Figure 7C:
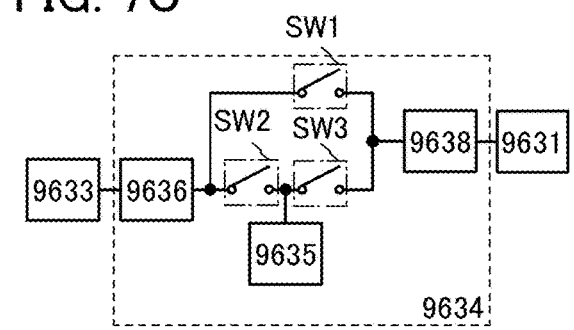

The structure and operation of the charge and discharge control circuit 9634 illustrated in FIG. 7B are described with reference to a block diagram in FIG. 7C. FIG. 7C illustrates the solar cell 9633, the battery 9635, the DCDC converter 9636, a converter 9638, switches SW1 to SW3, and the display portion 9631. The battery 9635, the DCDC converter 9636, the converter 9638, and the switches SW1 to SW3 correspond to the charge and discharge control circuit 9634 in FIG. 7B.

First, an example of operation in the case where power is generated by the solar cell 9633 using external light is described. The voltage of power generated by the solar cell is raised or lowered by the DCDC converter 9636 so that the power has a voltage for charging the battery 9635. Then, when power supplied from the battery 9635 charged by the solar cell 9633 is used for the operation of the display portion 9631, the switch SW1 is turned on and the voltage of the power is raised or lowered by the converter 9638 so as to be voltage needed for the display portion 9631. In addition, when display on the display portion 9631 is not performed, the switch SW1 is turned off and the switch SW2 is turned on so that the battery 9635 may be charged.

Although the solar cell 9633 is described as an example of a power generation means, the power generation means is not particularly limited, and the battery 9635 may be charged by another power generation means such as a piezoelectric element or a thermoelectric conversion element (Peltier element). The battery 9635 may be charged by a non-contact power transmission module which is capable of charging by transmitting and receiving power by wireless (without contact), or another charge means used in combination, and the power generation means is not necessarily provided.

Needless to say, one embodiment of the present invention is not particularly limited to the electronic device with the shape illustrated in FIGS. 7A to 7C as long as the display portion 9631 is included.

Example 1

In this example, examination results of an increase in the resistance to ESD due to a structure in which an outer end portion of a black matrix is positioned on an inner side than end portions of substrates are described.

In this example, an ESD test was conducted on a liquid crystal display device in which a driver circuit and a pixel portion are formed over one substrate to check a change in operation clearance (margin). The operation clearance (margin) refers to clearance of a voltage set in a design specification, and a normal operation can be performed even when a power supply voltage is lowered as long as the voltage is within the margin.

Measured samples are each an active matrix liquid crystal display device in which a pixel circuit and a driver circuit are formed over a first substrate (element substrate). The driver circuit and the pixel circuit were each formed using a bottom-gate top-contact semiconductor element including an oxide semiconductor in an active layer. The semiconductor element was covered with an acrylic resin layer to be planarized, and a common electrode was formed over the acrylic resin layer. A pixel electrode was formed over an insulating film (silicon nitride film) which was formed to cover the common electrode, and was covered with an alignment film. The liquid crystal display device in this example is a liquid crystal display device of the FFS mode.

A second substrate (counter substrate) was provided with a black matrix, color filters, a planarization film of an acrylic resin also serving as an overcoat layer, and an alignment film, and was sealed with a sealant at the peripheries of the end portions of the substrates.

Figure 8A:
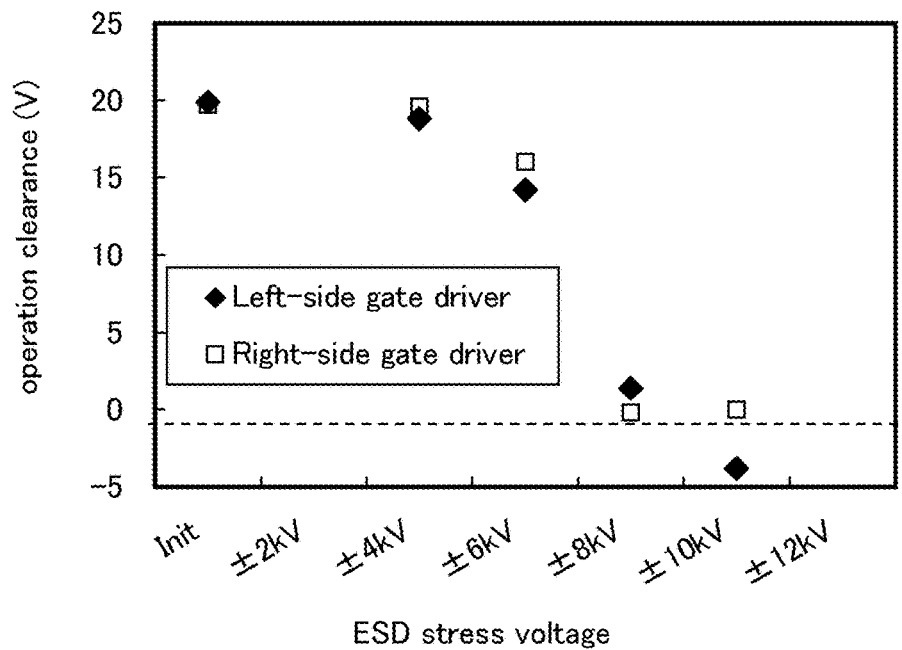
FIGS. 8A and 8B show results of an ESD test (voltage application on a counter substrate side).
Figure 8B:
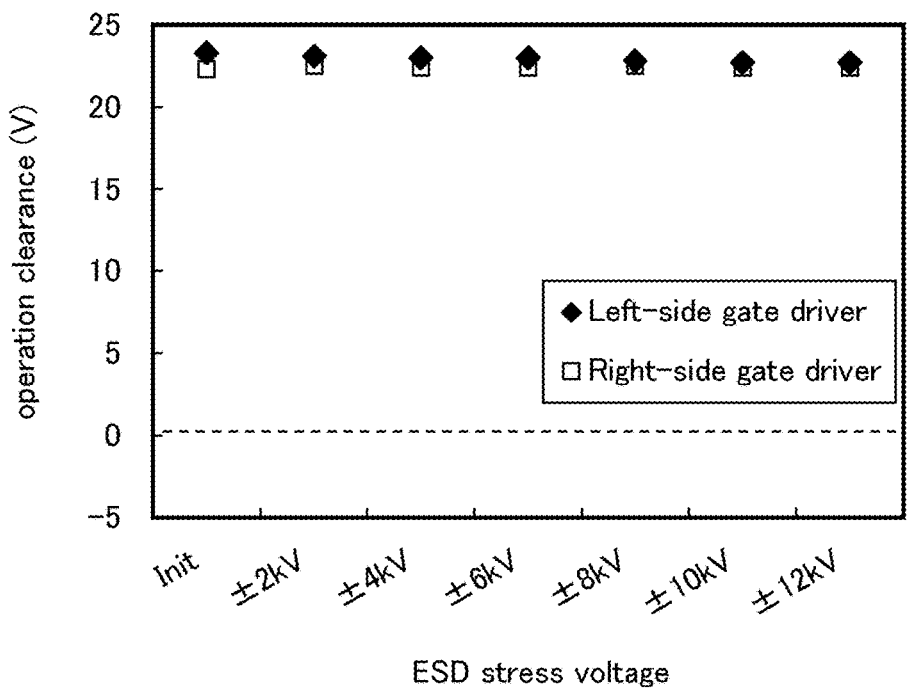
Figure 9A:
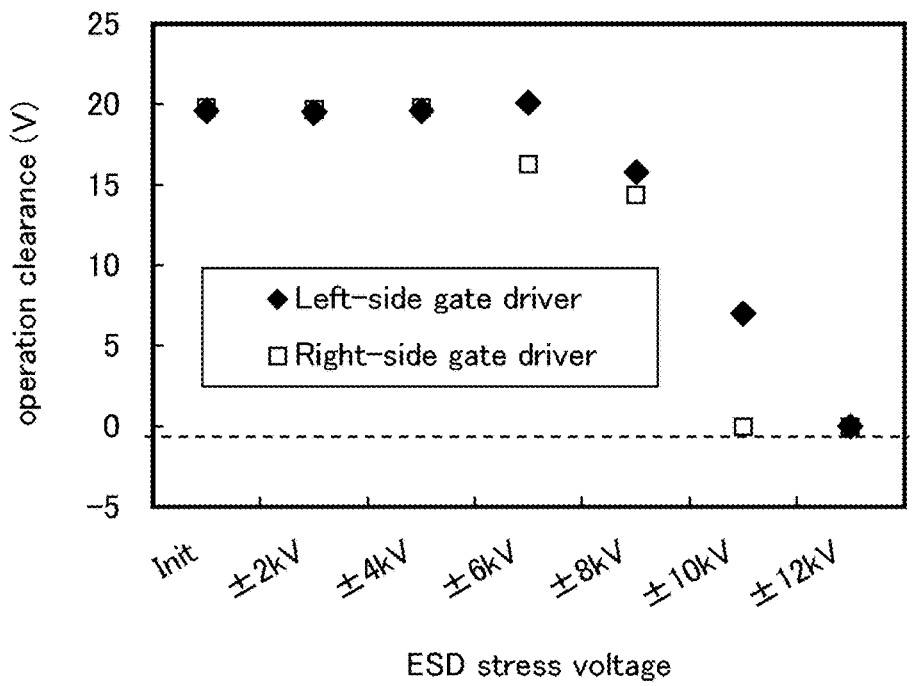
FIGS. 9A and 9B show results of an ESD test (voltage application on an element substrate side).
Figure 9B:
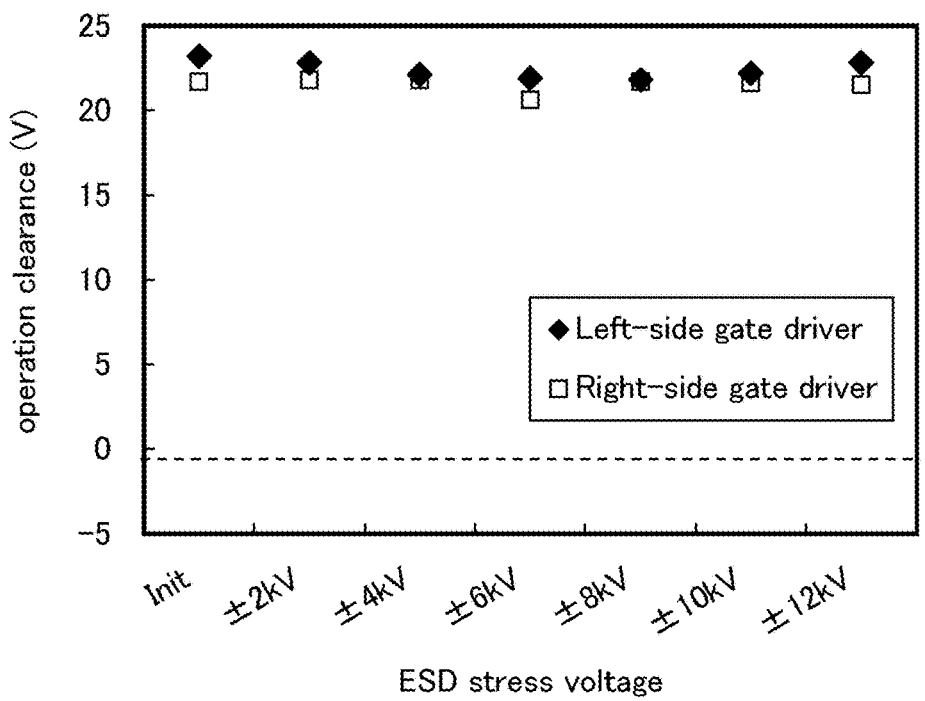

The ESD test was conducted as follows: a gun type testing machine based on the IEC standard 61000-4-2 was used, and a positive voltage and a negative voltage were each successively discharged ten times at intervals of 1 second in the condition where discharge resistance was 330Ω and discharge capacity was 150 pF. ESD was applied to three portions in total, that is, around the centers of two scan line driver circuits provided to face each other with a pixel region provided therebetween and a portion of the pixel region close to an input terminal. Results are shown in FIGS. 8A and 8B and FIGS. 9A and 9B. FIGS. 8A and 8B show the results at the time of applying ESD on the counter substrate side and FIGS. 9A and 9B show the results at the time of applying ESD on the element substrate side. The graphs in FIG. 8A and FIG. 9A each show results of the display device in which the black matrix was formed to extend to the end portions of the substrates. The graphs in FIG. 8B and FIG. 9B each show results of the display device in which an outer end portion of the black matrix was on an inner side than the end portions of the substrates by approximately 180 μm to 290 μm.

In FIG. 8A and FIG. 9A each showing the results of the liquid crystal display device in which the black matrix was formed to extend to the end portions of the substrates, the operation clearance (margin) of a driving element starts to decrease when ESD stress voltage exceeds 6 kV, and the margin is zero at 10 kV, which indicates that the liquid crystal display devices are inoperative. On the other hand, in FIG. 8B and FIG. 9B each showing the liquid crystal display device in which the outer end portion of the black matrix was on an inner side than the end portions of the substrates by approximately 180 μm to 290 μm, the operation clearance (margin) does not decrease even when a 12 kV of ESD is applied, which suggests that the resistance to ESD is increased in a liquid crystal display device having the structure.

This application is based on Japanese Patent Application serial No. 2013-032084 filed with Japan Patent Office on Feb. 21, 2013, the entire contents of which are hereby incorporated by reference.

What is claimed is:

1. A liquid crystal display device comprising:
   an element substrate;
   a counter substrate facing the element substrate;
   a liquid crystal layer between the counter substrate and the element substrate;
   a resin layer on the counter substrate;
   a planarization film covering the resin layer on the counter substrate, the planarization film comprising a resin;
   an electrode on the planarization film, the electrode having an opening pattern selected from one or more of a hole, a slit, and a cut line;

a sealant between the counter substrate and the element substrate; and a moisture impermeable layer covering an outer end of the planarization film, wherein the opening pattern of the electrode does not overlap with the sealant, wherein an outer end of the moisture impermeable layer is provided between the sealant and the counter substrate, and wherein the outer end of the planarization film and an outer end of the resin layer are not exposed to an outside atmosphere.

2. The liquid crystal display device according to claim 1, wherein the outer end of the moisture impermeable layer is exposed to the outside atmosphere.

3. The liquid crystal display device according to claim 1, wherein the resin layer includes at least one of a black matrix and a color filter.

4. The liquid crystal display device according to claim 1, wherein the moisture impermeable layer comprises a material selected from the group consisting of silicon nitride, silicon nitride oxide, aluminum nitride, silicon oxide, indium tin oxide, a conductive material in which zinc oxide is mixed with indium oxide, a conductive material in which silicon oxide is mixed with indium oxide, organic indium, organotin, indium oxide containing tungsten oxide, indium zinc oxide containing tungsten oxide, indium oxide containing titanium oxide, indium tin oxide containing titanium oxide, and graphene.

5. The liquid crystal display device according to claim 1, wherein the moisture impermeable layer comprises a transparent conductive oxide.

6. The liquid crystal display device according to claim 1, wherein the electrode comprises a transparent conductive oxide.

7. The liquid crystal display device according to claim 1, wherein a part of the sealant is in contact with the counter substrate.

8. The liquid crystal display device according to claim 1, wherein the liquid crystal layer is in contact with the electrode.

9. The liquid crystal display device according to claim 1, wherein a display mode of the liquid crystal display device is an IPS mode or an FFS mode.

10. The liquid crystal display device according to claim 1, wherein the element substrate has a transistor including an active layer comprising an oxide semiconductor.

11. A liquid crystal display device comprising:
an element substrate;
a counter substrate facing the element substrate;
a liquid crystal layer between the counter substrate and the element substrate;
a resin layer on the counter substrate;
a planarization film covering the resin layer on the counter substrate, the planarization film comprising a resin;
an electrode on the planarization film, the electrode having an opening pattern selected from one or more of a hole, a slit, and a cut line;
a sealant between the counter substrate and the element substrate; and
a moisture impermeable layer covering an outer end of the planarization film,
wherein the opening pattern of the electrode does not overlap with the sealant,
wherein the moisture impermeable layer is provided between the sealant and the planarization film, and
wherein the outer end of the planarization film and an outer end of the resin layer are not exposed to an outside atmosphere.

12. The liquid crystal display device according to claim 11, wherein an outer end of the moisture impermeable layer is exposed to the outside atmosphere.

13. The liquid crystal display device according to claim 11, wherein the resin layer includes at least one of a black matrix and a color filter.

14. The liquid crystal display device according to claim 11, wherein the moisture impermeable layer comprises a material selected from the group consisting of silicon nitride, silicon nitride oxide, aluminum nitride, silicon oxide, indium tin oxide, a conductive material in which zinc oxide is mixed with indium oxide, a conductive material in which silicon oxide is mixed with indium oxide, organic indium, organotin, indium oxide containing tungsten oxide, indium zinc oxide containing tungsten oxide, indium oxide containing titanium oxide, indium tin oxide containing titanium oxide, and graphene.

15. The liquid crystal display device according to claim 11, wherein the moisture impermeable layer comprises a transparent conductive oxide.

16. The liquid crystal display device according to claim 11, wherein the electrode comprises a transparent conductive oxide.

17. The liquid crystal display device according to claim 11, wherein a part of the sealant is in contact with the counter substrate.

18. The liquid crystal display device according to claim 11, wherein the liquid crystal layer is in contact with the electrode.

19. The liquid crystal display device according to claim 11, wherein a display mode of the liquid crystal display device is an IPS mode or an FFS mode.

20. The liquid crystal display device according to claim 11, wherein the element substrate has a transistor including an active layer comprising an oxide semiconductor.

21. A liquid crystal display device comprising:
an element substrate;
a counter substrate facing the element substrate;
a liquid crystal layer between the counter substrate and the element substrate;
a resin layer on the counter substrate;
a planarization film covering the resin layer on the counter substrate, the planarization film comprising a resin;
an electrode on the planarization film, the electrode having an opening pattern selected from one or more of a hole, a slit, and a cut line;
a sealant between the counter substrate and the element substrate; and
a moisture impermeable layer covering an outer end of the planarization film,
wherein the opening pattern of the electrode does not overlap with the sealant,
wherein the moisture impermeable layer is provided over the sealant and the liquid crystal layer and under the counter substrate, and
wherein the outer end of the planarization film and an outer end of the resin layer are not exposed to an outside atmosphere.

22. The liquid crystal display device according to claim 21, wherein an outer end of the moisture impermeable layer is exposed to the outside atmosphere.

23. The liquid crystal display device according to claim 21, wherein the resin layer includes at least one of a black matrix and a color filter.

24. The liquid crystal display device according to claim 21, wherein the moisture impermeable layer comprises a material selected from the group consisting of silicon nitride, silicon nitride oxide, aluminum nitride, silicon oxide, indium tin oxide, a conductive material in which zinc oxide is mixed with indium oxide, a conductive material in which silicon oxide is mixed with indium oxide, organic indium, organotin, indium oxide containing tungsten oxide, indium zinc oxide containing tungsten oxide, indium oxide containing titanium oxide, indium tin oxide containing titanium oxide, and graphene.

25. The liquid crystal display device according to claim 21, wherein the moisture impermeable layer comprises a transparent conductive oxide.

26. The liquid crystal display device according to claim 21, wherein the electrode comprises a transparent conductive oxide.

27. The liquid crystal display device according to claim 21, wherein a part of the sealant is in contact with the counter substrate.

28. The liquid crystal display device according to claim 21, wherein the liquid crystal layer is in contact with the electrode.

29. The liquid crystal display device according to claim 21, wherein a display mode of the liquid crystal display device is an IPS mode or an FFS mode.

30. The liquid crystal display device according to claim 21, wherein the element substrate has a transistor including an active layer comprising an oxide semiconductor.

* * * * *